US012182182B2

(12) United States Patent
Young et al.

(10) Patent No.: US 12,182,182 B2
(45) Date of Patent: *Dec. 31, 2024

(54) ORGANIZATION HIERARCHY SYSTEMS AND METHODS

(71) Applicant: DEALERWARE, LLC, Austin, TX (US)

(72) Inventors: Chip Young, Austin, TX (US); Fred Albino, Austin, TX (US); Lester DeKay, Austin, TX (US); Nimesh Kapadia, Austin, TX (US); Stuart Kilgore, Austin, TX (US); Vincent Musgrove, Austin, TX (US); Erika Ochoa Garcia, Austin, TX (US); Katie Tillman, Round Rock, TX (US)

(73) Assignee: DEALERWARE, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/485,037

(22) Filed: Oct. 11, 2023

(65) Prior Publication Data

US 2024/0095261 A1    Mar. 21, 2024

Related U.S. Application Data

(63) Continuation of application No. 17/585,430, filed on Jan. 26, 2022, now Pat. No. 11,809,462.

(51) Int. Cl.
*G06F 16/28* (2019.01)
*G06F 9/54* (2006.01)
(Continued)

(52) U.S. Cl.
CPC ............ *G06F 16/288* (2019.01); *G06F 9/547* (2013.01); *G06F 11/3409* (2013.01);
(Continued)

(58) Field of Classification Search
CPC .......................... G06F 16/288; G06F 16/2291
See application file for complete search history.

(56) References Cited

U.S. PATENT DOCUMENTS

| | | | | |
|---|---|---|---|---|
| 6,904,449 B1 * | 6/2005 | Quinones | ................ | H04L 67/53 709/219 |
| 8,200,527 B1 * | 6/2012 | Thompson | ............. | G06Q 30/00 705/7.41 |

(Continued)

OTHER PUBLICATIONS

"Organization Structures (Accountability)," martinfowler.com, https://martinfowler.com/apsupp/accountability.pdf. Accessed Aug. 12, 2021.

*Primary Examiner* — Eliyah S. Harper
(74) *Attorney, Agent, or Firm* — Norton Rose Fulbright US LLC

(57) ABSTRACT

This disclosure provides systems, methods, and apparatuses, including computer programs encoded on computer storage media, for accessing information associated with an organization hierarchy. In one aspect of the disclosure, a method includes transmitting, from a device to a server in which multiple group models are stored, an access request to access a first group model of the multiple group models. Each group model of the multiple group models is associated with a different organization and includes multiple group data structures, multiple group type data structures, and multiple group member data structures. Each group model is associated with group hierarchy information that indicates a hierarchy associated with the multiple group data structures associated with the group model. The method further includes receiving, at the device and based on the access request, first hierarchy information associated with a first group model. Other aspects and features are also claimed and described.

20 Claims, 22 Drawing Sheets

(51) Int. Cl.
*G06F 11/34* (2006.01)
*G06F 16/22* (2019.01)
*G06F 21/62* (2013.01)

(52) U.S. Cl.
CPC ...... *G06F 16/2291* (2019.01); *G06F 21/6218* (2013.01); *G06F 2221/2141* (2013.01)

(56) References Cited

U.S. PATENT DOCUMENTS

| | | | |
|---|---|---|---|
| 8,560,970 B2* | 10/2013 | Liddington | G06F 16/54 |
| | | | 715/853 |
| 8,965,931 B2 | 2/2015 | McGreevy et al. | |
| 9,143,563 B2 | 9/2015 | Pingel et al. | |
| 9,239,573 B2 | 1/2016 | Reichard | |
| 9,817,991 B2* | 11/2017 | Boncha | G06F 21/6218 |
| 10,037,352 B1* | 7/2018 | Dyer | G06F 16/282 |
| 10,685,328 B2 | 6/2020 | Harris et al. | |
| 10,867,269 B2 | 12/2020 | Smith et al. | |
| 11,164,132 B2* | 11/2021 | Apps | G06Q 10/0633 |
| 2002/0107873 A1 | 8/2002 | Winkler et al. | |
| 2003/0055812 A1* | 3/2003 | Williams | G06F 16/904 |
| 2006/0242122 A1* | 10/2006 | DeVorchik | G06F 16/148 |
| 2008/0243581 A1* | 10/2008 | Jennings | G06Q 10/06 |
| | | | 705/7.32 |
| 2010/0100427 A1* | 4/2010 | McKeown | G06Q 10/067 |
| | | | 705/320 |
| 2011/0072052 A1* | 3/2011 | Skarin | G06F 16/288 |
| | | | 707/E17.098 |
| 2011/0191203 A1 | 8/2011 | Hughes et al. | |
| 2014/0019471 A1 | 1/2014 | Linton et al. | |
| 2014/0351299 A1* | 11/2014 | Pudipeddi | G06F 16/2291 |
| | | | 707/822 |
| 2016/0321377 A1 | 11/2016 | Noble | |
| 2018/0300437 A1* | 10/2018 | Thomsen | G06F 16/24573 |
| 2019/0205773 A1* | 7/2019 | Ackerman | G06F 21/64 |
| 2019/0392361 A1 | 12/2019 | Paul et al. | |
| 2020/0012265 A1 | 1/2020 | Thomsen et al. | |
| 2020/0234205 A1* | 7/2020 | Apps | G06N 20/00 |
| 2020/0364953 A1 | 11/2020 | Simoudis | |
| 2021/0097456 A1 | 4/2021 | Sayyarrodsari et al. | |
| 2021/0192411 A1* | 6/2021 | Conaway | B64D 43/00 |
| 2022/0092028 A1 | 3/2022 | Layton et al. | |

* cited by examiner

700

| | Name | Group ID | Group_Type | Parent_Group |
|---|---|---|---|---|
| 710 | Name | Group ID | Group_Type | Parent_Group |
| 711 | Entity_1 | 1 | OEM | |
| 712 | Region_1NE | 2 | Region | OEM |
| | Region_1CE | 3 | Region | OEM |
| | Region_1SE | 4 | Region | OEM |
| | Region_1PA | 5 | Region | OEM |
| | Area_1A | 6 | Area | Region_1NE |
| | Area_1B | 7 | Area | Region_1NE |
| | Area_1C | 8 | Area | Region_1CE |
| | Area_1D | 9 | Area | Region_1CE |
| | Area_1E | 10 | Area | Region_1SE |
| | Area_1F | 11 | Area | Region_1SE |
| | SubArea_1AA | 12 | Area | Region_1PA |
| | SubArea_1AB | 13 | Area | Region_1PA |
| | Area_1G | 14 | Area | SubArea_1AA |
| | Area_1H | 15 | Area | SubArea_1AA |
| | Area_1I | 16 | Area | SubArea_1AB |
| | Area_1J | 17 | Area | SubArea_1AB |
| | Deal_1a | 18 | Dealer | Area_1A |
| | Deal_1b | 19 | Dealer | Area_1A |
| | Deal_1c | 20 | Dealer | Area_1B |
| | Deal_1d | 21 | Dealer | Area_1B |
| | Deal_1e | 22 | Dealer | Area_1C |
| | Deal_1f | 23 | Dealer | Area_1D |
| | Deal_1g | 24 | Dealer | Area_1E |
| | Deal_1h | 25 | Dealer | Area_1E |
| | Deal_1i | 26 | Dealer | Area_1F |
| | Deal_1j | 27 | Dealer | Area_1G |
| | Deal_1k | 28 | Dealer | Area_1G |
| | Deal_1l | 29 | Dealer | Area_1H |
| | Deal_1m | 30 | Dealer | Area_1I |
| | Deal_1n | 31 | Dealer | Area_1I |
| | Deal_1o | 32 | Dealer | Area_1I |
| | Deal_1p | 33 | Dealer | Area_1J |
| | Deal_1q | 34 | Dealer | Area_1J |

*FIGURE 7*

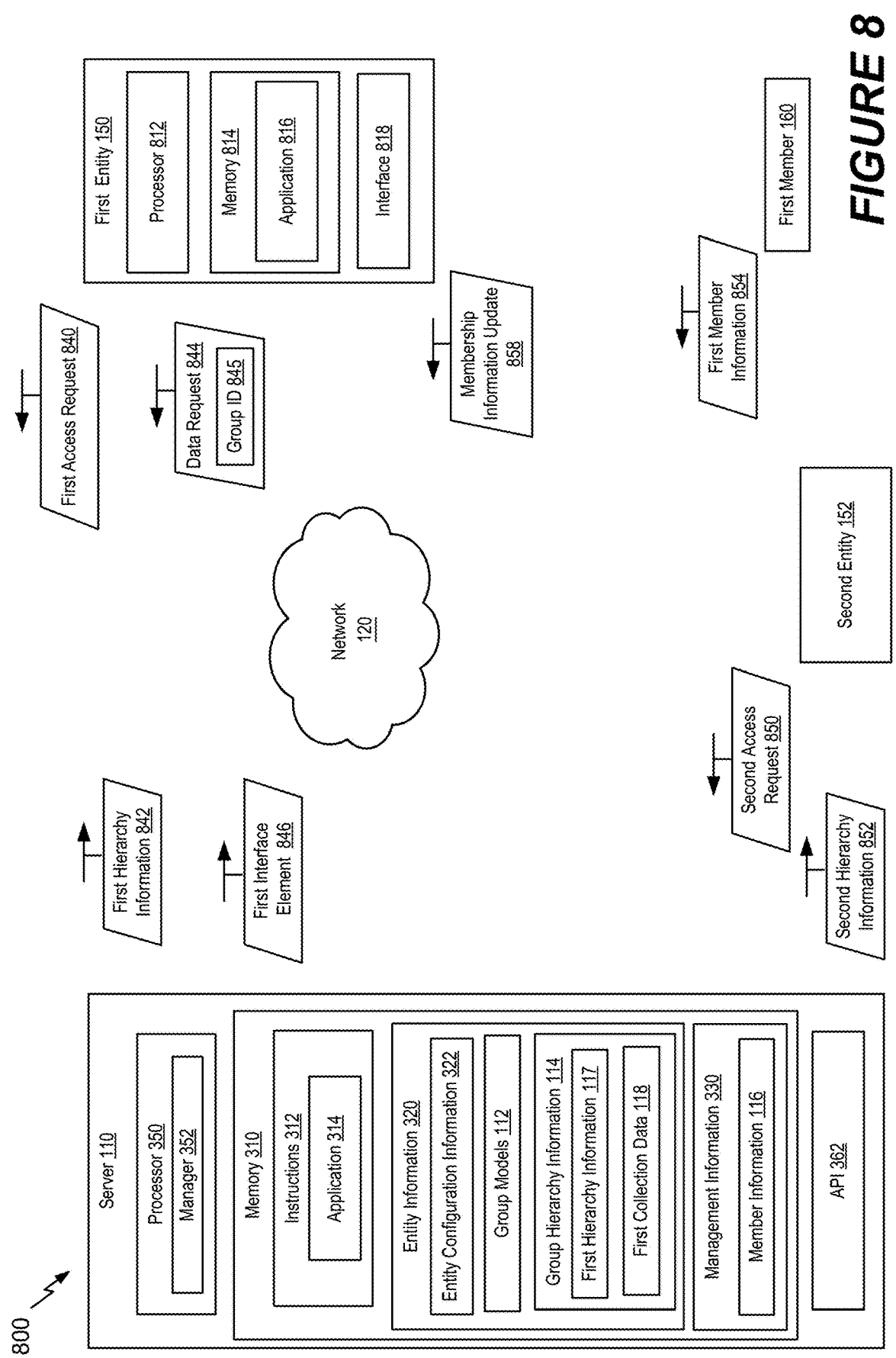

Utilization Report

All Regions > Region B > Area 204

Dealership Utilization (11)

Search Dealerships | Oct 1, 2020 – Today

| Dealership Name | Region | Area | Dealer Code | Vehicle Count | Avg Length of Loan | Avg Utilization |
|---|---|---|---|---|---|---|
| Frisco Dealership | Region B | 204 | 364978 | 28 | 1.98 days | 91% |
| Abilene Dealership | Region B | 204 | 369710 | 46 | 2.13 days | 95% |
| Pearland Dealership | Region B | 204 | 366971 | 67 | 2.16 days | 93% |
| Woodlands Dealership | Region B | 204 | 377941 | 13 | 2.58 days | 92% |
| College Station Dealership | Region B | 204 | 309871 | 21 | 2.86 days | 91% |
| Tyler Dealership | Region B | 204 | 365791 | 39 | 1.86 days | 90% |
| Lewisville Dealership | Region B | 204 | 365018 | 67 | 3.87 days | 88% |
| Allen Dealership | Region B | 204 | 319970 | 80 | 3.12 days | 85% |
| San Angelo Dealership | Region B | 204 | 369741 | 48 | 2.16 days | 82% |
| Conroe Dealership | Region B | 204 | 356584 | 67 | 2.67 days | 79% |
| Bryan Dealership | Region B | 204 | 318845 | 21 | 2.70 days | 78% |
| Mission Dealership | Region B | 204 | 378164 | 28 | 1.98 days | 72% |

Rows per page: 11    1-11

FIGURE 17

ORGANIZATION HIERARCHY SYSTEMS AND METHODS

CROSS-REFERENCE TO RELATED APPLICATIONS

This application is a continuation of U.S. application Ser. No. 17/585,430, filed Jan. 26, 2022, the contents of which is incorporated into the present application by reference in its entirety.

TECHNICAL FIELD

Aspects of the present disclosure relate generally to a representation of an organization hierarchy and more particularly, but not by way of limitation, to systems and methods for management of one or more organizational hierarchies. Some features may enable and provide for flexibility to define an organizational hierarchy and improved management of at any level of the organizational hierarchy, including data analysis and a simplified interface for tools, services, and applications.

DESCRIPTION OF THE RELATED TECHNOLOGY

Organizations typically have different structures associated with organizational hierarchies that vary based on a variety of factors, such as a type of business, physical location of offices, and distribution facilities, as illustrative, non-limiting examples. As a result of the different structures and organizational hierarchies, each organization typically uses a customized and static solution, such as a hard-coded solution, for reporting and performing analytics, such as aggregation of data for products or services, sales, utilization, revenue, or a combination thereof, across the organization. The customized and static nature of each solution provides limited flexibility to modify the solution as the organization's or customer's needs, or the organizational structure, change over time. Accordingly, modifications to an existing solution can be time consuming and costly to implement.

As an illustrative example, the different organizations may include different original equipment manufacturers (OEMs), such as different auto manufacturers. The different OEMs may have different organizational hierarchies, such as different numbers of hierarchical levels, different names for each hierarchical level, or a combination thereof. For example, a first OEM may have an organizational structure that includes one or more regions, which are composed of one or more areas, which are composed of one or more dealers, distributors, or sellers. As another example, a second OEM may have an organizational structure that includes one or more areas, which are composed on one or more sub-areas, which are composed of one or more groups, which are composed of one or more dealers, distributors, or sellers. Within the context of OEMs, different dealers, distributors, or sellers may operate or do business with multiple OEMs. Solutions for reporting and analytics for different OEMs do not extend to and provide a comprehensive solutions for the different dealers, distributors, or sellers. To illustrate, individual solutions of different OEMs do not provide a dealer, distributor, or seller with reporting and analytics for the dealer, distributor, or seller that operates with multiple OEMs. Accordingly, a dealer, distributor, or seller needs to implement its own solution for reporting and analytics, which increases cost and adds unnecessary complexity and inefficiencies to the operation of the dealer, distributor, or seller.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One innovative aspect of the subject matter described in this disclosure can be implemented in a method for managing member information associated with multiple organization hierarchies. The method is performed at a server storing member information and a plurality of group models. Each group model of the plurality of group models is associated with a different organization of a plurality of organizations and includes multiple group data structures, multiple group type data structures, and multiple group member data structures. Each group model of the plurality of group models is associated with group hierarchy information that indicates a hierarchy associated with the multiple group data structures associated with the group model. The method includes receiving, from a user device, an access request to access a first group model of the plurality of group models. The first group model is associated with a first organization of the plurality of organizations. The method further includes sending, to the user device and based on the access request, first hierarchy information associated with the first group model.

Another innovative aspect of the subject matter described in this disclosure can be implemented in a server. The server includes at least one processor and a memory coupled with the at least one processor and storing processor-readable code that, when executed by the at least one processor, is configured to store member information and a plurality of group models. Each group model of the plurality of group models is associated with a different organization of a plurality of organizations and includes multiple group data structures, multiple group type data structures, and multiple group member data structures. Each group model of the plurality of group models is associated with group hierarchy information that indicates a hierarchy associated with the multiple group data structures associated with the group model. The processor-readable instructions, when executed by the at least one processor, is further configured to receive, from an electronic device, an access request to access a first group model of the plurality of group models. The first group model is associated with a first organization of the plurality of organizations. The processor-readable instructions, when executed by the at least one processor, is further configured to initiate transmission, to the electronic device and based on the access request, of first hierarchy information associated with the first group model.

Another innovative aspect of the subject matter described in this disclosure can be implemented in an apparatus configured for wireless communication. The apparatus includes means for storing member information and a plurality of group models. Each group model of the plurality of group models is associated with a different organization of a plurality of organizations and includes multiple group data structures, multiple group type data structures, and multiple group member data structures. Each group model of the plurality of group models is associated with group hierarchy information that indicates a hierarchy associated with the multiple group data structures associated with the group model. The apparatus further includes means for receiving, from an electronic device, an access request to access a first group model of the plurality of group models. The first group model is associated with a first organization of the plurality of organizations. The apparatus further includes means for transmitting, to the electronic device and based on the access request, first hierarchy information associated with the first group model.

Another innovative aspect of the subject matter described in this disclosure can be implemented in a non-transitory computer-readable medium storing instructions that, when executed by a processor, cause the processor to perform operations including storing member information and a plurality of group models. Each group model of the plurality of group models is associated with a different organization of a plurality of organizations and includes multiple group data structures, multiple group type data structures, and multiple group member data structures. Each group model of the plurality of group models is associated with group hierarchy information that indicates a hierarchy associated with the multiple group data structures associated with the group model. The operations further include receiving, from an electronic device, an access request to access a first group model of the plurality of group models. The first group model is associated with a first organization of the plurality of organizations. The operations further include initiating transmission, to the electronic device and based on the access request, of first hierarchy information associated with the first group model.

Another innovative aspect of the subject matter described in this disclosure can be implemented in a method for accessing member information from a server storing multiple organization hierarchies. The method includes transmitting, from a user device to a server in which member information and a plurality of group models is stored, an access request to access a first group model of the plurality of group models. The first group model is associated with a first organization of a plurality of organizations. Each group model of the plurality of group models is associated with a different organization of a plurality of organizations and includes multiple group data structures, multiple group type data structures, and multiple group member data structures. Each group model of the plurality of group models is associated with group hierarchy information that indicates a hierarchy associated with the multiple group data structures associated with the group model. The method further includes receiving, at the user device and based on the access request, first hierarchy information associated with the first group model.

Another innovative aspect of the subject matter described in this disclosure can be implemented in an electronic device. The electronic device includes at least one processor and a memory coupled with the at least one processor and storing processor-readable instructions that, when executed by the at least one processor, is configured to initiate transmission, to a server in which member information and a plurality of group models is stored, of an access request to access a first group model of the plurality of group models. The first group model is associated with a first organization of a plurality of organizations. Each group model of the plurality of group models is associated with a different organization of a plurality of organizations and includes multiple group data structures, multiple group type data structures, and multiple group member data structures. Each group model of the plurality of group models is associated with group hierarchy information that indicates a hierarchy associated with the multiple group data structures associated with the group model. The processor-readable instructions, when executed by the at least one processor, is further configured to receive, based on the access request, first hierarchy information associated with the first group model.

Another innovative aspect of the subject matter described in this disclosure can be implemented in an apparatus configured for wireless communication. The apparatus includes means for transmitting, to a server in which member information and a plurality of group models is stored, an access request to access a first group model of the plurality of group models. The first group model is associated with a first organization of a plurality of organizations. Each group model of the plurality of group models is associated with a different organization of a plurality of organizations and includes multiple group data structures, multiple group type data structures, and multiple group member data structures. Each group model of the plurality of group models is associated with group hierarchy information that indicates a hierarchy associated with the multiple group data structures associated with the group model. The apparatus further includes means for receiving, based on the access request, first hierarchy information associated with the first group model.

Another innovative aspect of the subject matter described in this disclosure can be implemented in a non-transitory computer-readable medium storing instructions that, when executed by a processor, cause the processor to perform operations including initiating transmission, to a server in which member information and a plurality of group models is stored, of an access request to access a first group model of the plurality of group models. The first group model is associated with a first organization of a plurality of organizations. Each group model of the plurality of group models is associated with a different organization of a plurality of organizations and includes multiple group data structures, multiple group type data structures, and multiple group member data structures. Each group model of the plurality of group models is associated with group hierarchy information that indicates a hierarchy associated with the multiple group data structures associated with the group model. The operations further include receiving, based on the access request, first hierarchy information associated with the first group model.

Some details associated with the implementations are described above, and others are described below. Other aspects, features, and implementations of the present disclosure will become apparent to a person having ordinary skill in the art, upon reviewing the following description of specific, example implementations of the present disclosure in conjunction with the accompanying figures. While features of the present disclosure may be described relative to particular implementations and figures below, all implementations of the present disclosure can include one or more of the advantageous features described herein. In other words, while one or more implementations may be described as having particular advantageous features, one or more of such features may also be used in accordance with the various implementations of the disclosure described herein. In similar fashion, while example implementations may be described below as device, system, or method implementations, such example implementations can be implemented in various devices, systems, and methods. Other implementations, advantages, and features of the present disclosure will become apparent after review of the entire application, including the following sections: Brief Description of the Drawings, Detailed Description, and the Claims.

BRIEF DESCRIPTION OF THE DRAWINGS

A further understanding of the nature and advantages of the present disclosure may be realized by reference to the following drawings. The following drawings illustrate by way of example and not limitation. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 7 is a diagram illustrating an example of hierarchy information associated with a data model according to one or more aspects.

FIG. 8 is a block diagram of another example of a system for management of one or more organizational hierarchies according to one or more aspects.

FIG. 17 illustrates an example of an interface associated with a utilization report according to one or more aspects.

Like reference numbers and designations in the various drawings indicate like elements.

DETAILED DESCRIPTION

Figure 1:
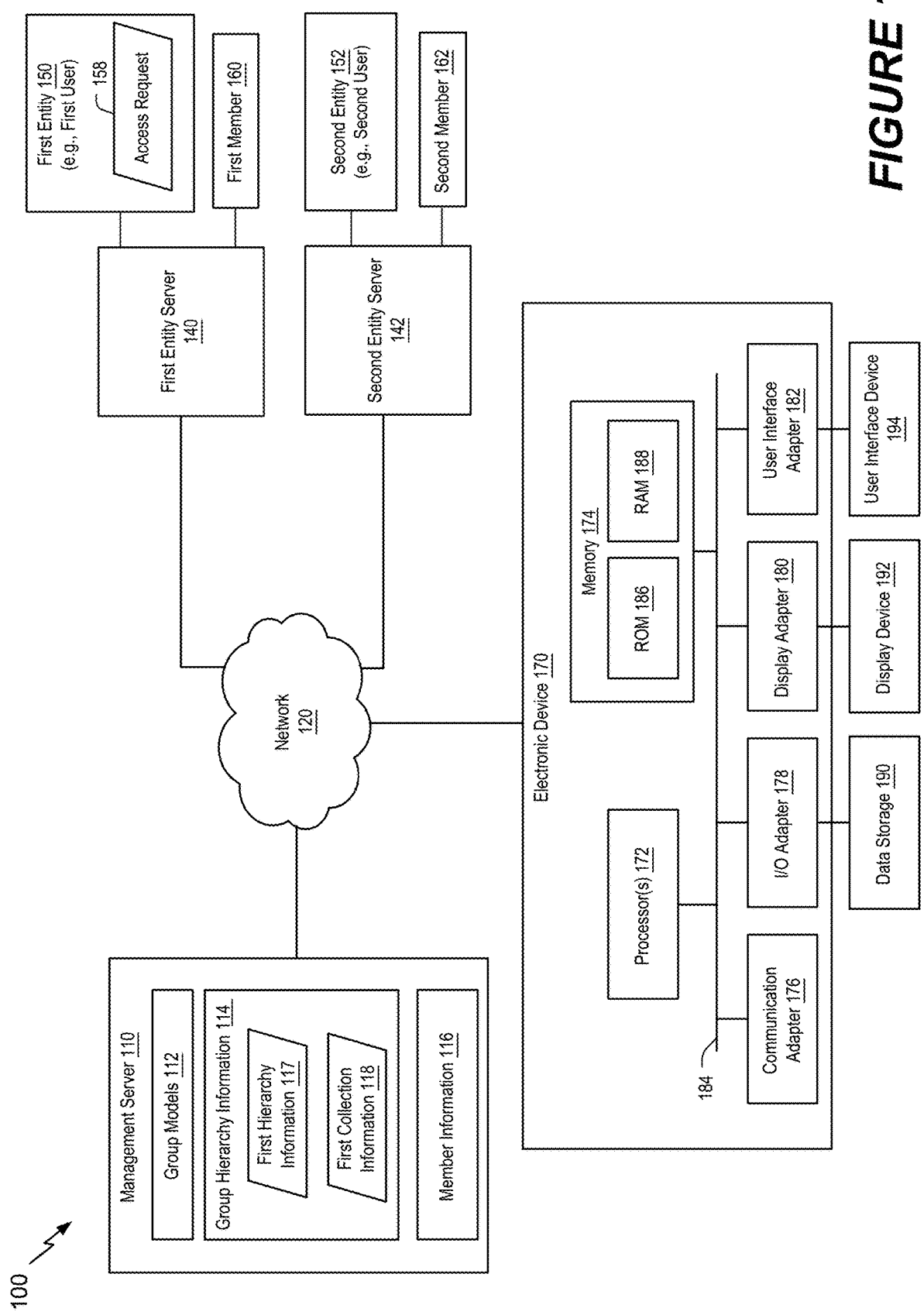
FIG. 1 is a block diagram of an example of a system that includes a server for management of one or more organizational hierarchies according to one or more aspects.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

The present disclosure provides systems, apparatus, methods, and computer-readable media for management of one or more organizational hierarchies. For example, the present disclosure describes a data model that represents an organizational hierarchy of an organization, such as an original equipment manufacturers (OEM), a company, or a government organization, as illustrative, non-limiting examples. The organizational structure may represent a structure of the organization and may be associated with one or more members (also referred to herein as one or more units), such as a product, a service, a resource, a component, an employee, or a combination thereof, as illustrative, non-limiting examples. In some implementations, an application platform, such as a server, may include, for each of multiple organizations, a data model associated with an organizational hierarchy of the organization.

One or more data models may be generated based on a data model pattern such that each data model includes one or more group data structures, one or more group type data structures, one or more group member data structures, or a combination thereof. A group data structure may include a name, a group identifier (ID) of the group data structure, an indication of a parent group data structure of the group data structure, or a combination thereof. A group type data structure may indicate a type or classification to be applied to at least one group data structure. A group member data structure may indicate one or more members included in at least one group data structure. The one or more members indicated by the group member data structure may be associated with member information of the one or more members.

Based on a first data model associated with a first organization, a server may generate first hierarchy information that indicates an organizational hierarchy of the of the one or more group data structures of the first data model. The first hierarchy may include one or more group IDs of the one or more group data structure of the first data model. Additionally, the server may generate an aggregation of member information associated with the one or more group member data structures. The server may also be configured to generate reports or analytics associated with the first organization. In some implementations, the server may generate the reports or analytics for different levels or different groups of the organizational hierarchy of the first organization. Additionally, or alternatively, the server may be configured to generate display information associated with one or more display and associated with one or more organizations. The display information may include or be associated with report or analytic information, or other information to present a visual or graphical representation of at least a portion of one or more data models. The first hierarchy information may be provided to an electronic device, such as a user device, of a user of the first organization to enable the electronic device to access the member information associated with the one or more members included in the first organization. For example, the electronic device may send an access request that includes a first group ID of a first group of the data model to request member information associated with the first group. Based on the first group ID, the server may send first member information based on the first group ID to the electronic device. In some implementations, the sever may identify, based on the first group ID, a portion of an aggregation of one or more members associated with the first data model and send the portion, or a report based on the portion, to the electronic device.

As an illustrative example of the present disclosure, a server stores a data model associated with an organization, such as an OEM that produces members (e.g., vehicles). The OEM (e.g., a vehicle manufacturer) may have an organizational hierarchy and may provide members to different dealerships for sale or use (e.g., lease) and may track one or metrics of at least one member. The organizational hierarchy may include a first group (e.g., a first entity) having an OEM group type. Additionally, the first group may be composed of a second group (e.g., a second entity) having a region group type. The second group may be composed of a third group (e.g., a first dealership) having a dealer group type and a fourth group (e.g., a second dealership) having the dealer group type. The first dealership may include a first member (e.g., a first vehicle) and the second dealership may include a second member (e.g., a second vehicle). The data model associated with the organization may represent the organizational hierarchy and the sever may generate, based on the data model, hierarchy information that indicates the organizational hierarchy of the organization and an aggregation of member information associated with the first member and the second member.

Particular implementations of the subject matter described in this disclosure can be implemented to realize one or more of the following potential advantages. In some aspects, the present disclosure enables and provides flexibility for defining a data model for representing an organizational hierarchy (e.g., an organizational structure). For example, a data model may be easily generated, according to a data model pattern, for any kind of multi-level organizational hierarchy. Accordingly, data models for different organizations may be represented in a uniform and consistent manner that provides efficient storage, management, use of the data models, and improved and efficient operation of a server that stores and maintains the data models. In another aspect, the present disclosure enables improved management of members at any level of the organization hierarchy, including data analysis and a simplified interface for tools, services, and applications. By using the same data model pattern to represent each of the data models, a same set of tools to each data model may be used with different organizations to provide for reporting and analytics for each organization. Additionally, the data models based on the same data model pattern enables metrics for and between different organizations to be easily analyzed and compared such that member usage optimization across multiple organizations can be identified. In some implementations, the common data model pattern used for different data models enables a single member to be included in multiple data models such that different organizations have access to the same member information, thereby reducing storage of duplicate member information. In some aspects, the present disclosure provides efficient management, reporting, and analytics for large data sets. For example, data models described herein may be used to generate hierarchical information of an organizational hierarchy that is smaller in size than an amount of member information associated with the organizational hierarchy. The hierarchical information may be efficiently provided to an electronic device associated with an organization represented by the organizational hierarchy and be used as a navigational element for the electronic device to access the member information. For example, the hierarchical information enable the electronic device to easily navigate and request metrics (e.g., key performance indicators), reports, or a combination thereof, for an entirety or a sub-set of the member information.

Referring to FIG. 1, a block diagram of a system that includes a server for management of member information associated with multiple organizational hierarchies is shown and designated 100. System 100 includes a server 110 (e.g., a management server), a network 120, a first entity server 140, a second entity server 142, a first entity 150, a second entity 152, a first member 160, a second member 162, and an electronic device 170.

Server 110 may include one or more servers that, according to one implementation, are configured to perform several of the functions or operations described herein. One or more of the servers, including server 110, may include memory, storage hardware, software residing thereon, and one or more processors configured to perform functions associated with system 100, as described further herein at least with reference to at least FIGS. 3, 6, 8, and 9. Different server and computer architectures can be utilized to implement server 110, and server 110 is not limited to a particular architecture so long as the hardware implementing server 110 supports the functions of the management system disclosed herein. As shown in FIG. 1, electronic device 170 can be used to enable an owner, agent, or administrator of server 110 to access and modify aspects (e.g., instructions, applications, or data) of or associated with server 110. For example, components including electronic device 170, such as one or more processors 172, can be used to interface with or implement the server 110. Accordingly, electronic device 170 may serve as a management portal by which a user may access a management system disclosed herein. The portal can function to allow multiple users, inside and outside system 100 (e.g., at multiple different instances of electronic device 170), to interface with server 110. Additionally, it is noted that the one or more components described with reference to electronic device 170 may also be included in one or more of server 110, first entity server 140, second entity server 142, first entity 150, second entity 152, first member 160, or second member 162.

As shown, server 110 includes group models 112, group hierarchy information 114, and member information 116. Group models 112 may include one or more data models and each data model may represent an organizational hierarchy of an organization, such as an original equipment manufacturers (OEM), a company, or a government organization, as illustrative, non-limiting examples. Examples of different organizational hierarchies are described further herein at least with reference to FIG. 2. In some implementations, at least one data model of group models 112 may be generate based on or according to a data model pattern such that the at least one data model includes one or more group data structures, one or more group type data structures, one or more group member data structures, or a combination thereof. Examples of data model patterns are described further herein at least with reference to FIGS. 4 and 5. In some implementations, data associated with or representative of the data model pattern may be include in group models 112.

A group data structure may include a name, a group identifier (ID) of the group data structure, an indication of a parent group data structure of the group data structure, or a combination thereof. A group type data structure may indicate a type or classification to be applied to at least one group data structure. A group member data structure may indicate one or more members included in at least one group data structure. The one or more members indicated by the group member data structure may be associated with member information of the one or more members.

Group hierarchy information 114 includes first hierarchy information 117 and first collection information 118. First hierarchy information 117 indicates an organizational hierarchy of one or more group data structures of a first data model of group models 112. An example of first hierarchy information is described further herein at least with reference to FIG. 7. First collection information 118 includes an aggregation of member information of one or more members associated with the first data model. Member information 116 includes information associated with one or more members. The one or more members may be associated with one or more data models of the group models 112. In some implementations, the one or more members include first member 160 or second member 162.

Figure 3:
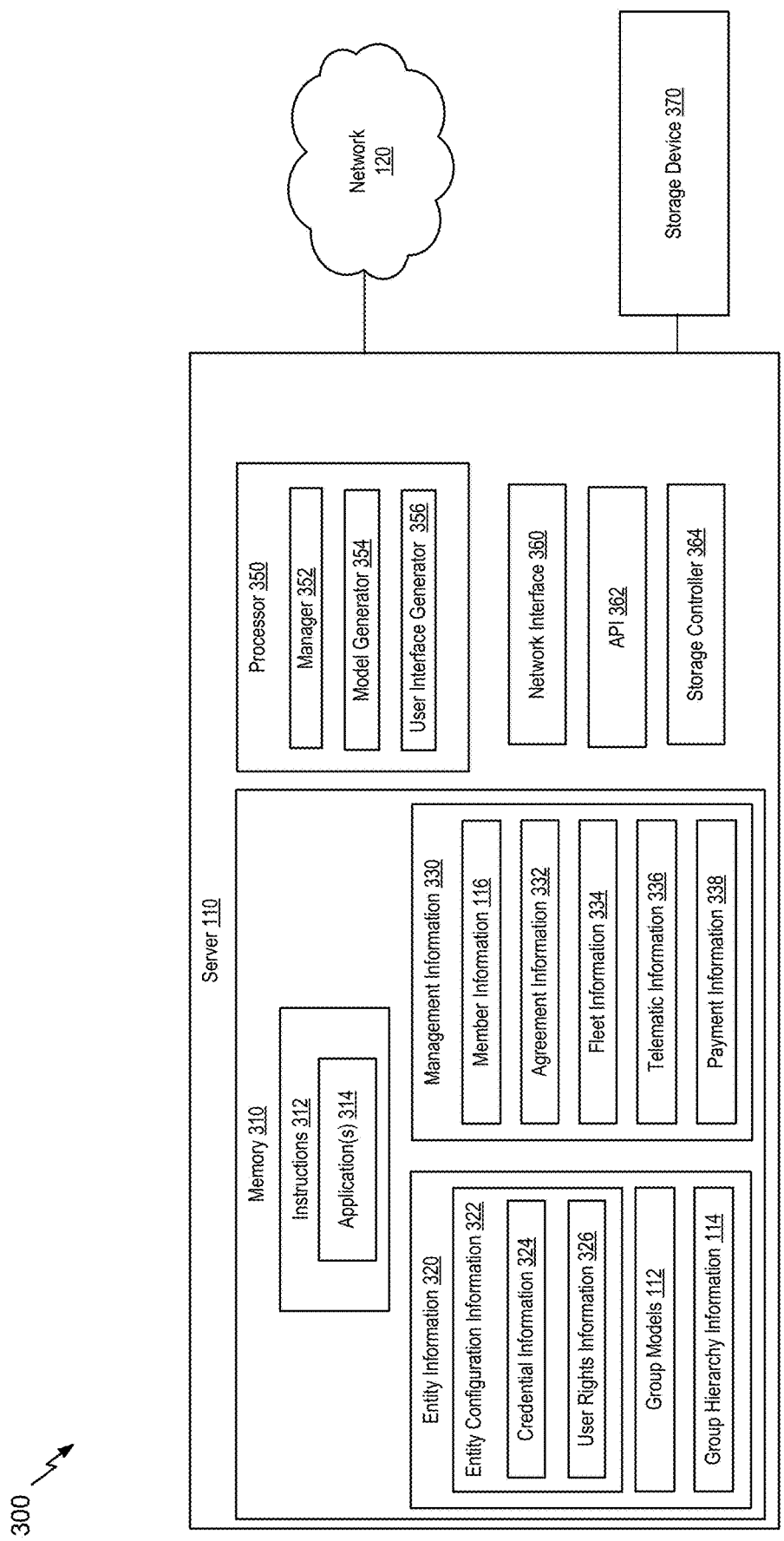
FIG. 3 is a block diagram of another example of a system for management of one or more organizational hierarchies according to one or more aspects.

In some implementations, server 110 may include data storage, a storage controller, or a combination thereof, as describe further herein at least with reference to FIG. 3. In some implementations, a portion or an entirety of data storage may be separate from, such as remote from, server 110. A portion or an entirety of group models 112, group hierarchy information 114, member information 116, or a combination thereof, may be stored at the data storage and may be accessible by server 110, such as via the storage controller.

Network 120, such as a communication network, may facilitate communication of data between server 110 and other components, servers or processors, devices, or a combination thereof. For example, network 120 may also facilitate communication of data between server 110, data storage, first entity server 140, second entity server 142, first entity 150, second entity 152, first member 160, second member 162, or any combination therefore. Network 120 may include a wired network, a wireless network, or a combination thereof. For example, network 120 may include any type of communications network, such as a direct PC-to-PC connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate.

Each of first entity server 140 and second entity server 142 may include one or more servers which a respective entity, such as first entity 150 and second entity 152, may use to support its operations. Each of first entity 150 and second entity 152 may include an individual, an organization, a company, a corporation, a department, a government department or organization, an original equipment manufacturer (OEM), or a group of individuals. For example, one entity may be an OEM, such as an automotive manufacturer. As another example, another entity may be a corporation with retail locations spread across multiple geographic regions (e.g., counties, states, or countries). As another example, another entity may be a corporation with cruise ships.

In some implementation, each of first entity 150 and second entity 152 includes or is associated with at least one user who can access server 110. For example, the user may access server 110 via an application, such as an application hosted by server 110. To illustrate, the user may have an account (e.g., on behalf of first entity 150) and may log in to server 110 via the application. Although system 100 shows two entities, in other implementations, system 100 includes a single entity or more than two entities. In some implementations, first entity 150 and second entity 152 may be part of (e.g., subsidiaries of) a parent company, may be part of or associated with the same organizational hierarchy, or may be distinct entities.

In some implementations, first entity 150 includes or is configured to generate (or initiate generation of) an access requests 158. Responsive to the access request 158, first entity 150 may receive first hierarchy information 117, at least a portion of first collection information 118, or a combination thereof. In other implementations, first entity 150 provides a query or one or more parameters for a query which is performed by server 110 to generate an output to be provided to first entity. The output may include a report, analytics, or a combination thereof based on or associated with first collection information 118, member information 116, or both.

In some implementations, first member 160 and second member 162 may be associate with a product, a service, a resource, a component, a device (e.g., an Internet-of-Things (TOT) device, a point of sale device, or a satellite), an individual (e.g., a sales representative, an employee, or a soldier), or a combination thereof, as illustrative, non-limiting examples. As an illustrative, non-limiting example, each of first member 160 and second member 162 correspond to a respective vehicle or a component thereof, such as one or more vehicle computing devices (e.g., coupled to the respective vehicle) which can be configured to communicate with server 110 over network 120 (e.g., the Internet). Communication between a member and another device may occur via wireless communication path, such as code divisional multiple access (CDMA), global system for mobiles (GSM), orthogonal frequency-division multiplexing (OFDM), or wireless fidelity (WiFi), as illustrative, non-limiting examples. Additionally, or alternatively, first member 160 and second member 162 may include at least one portable computing device, such as a communications device, a fixed location data unit, a mobile location data unit, a mobile phone, a cellular phone, a satellite phone, a computer, a tablet, a portable computer, a display device, a media player, or a desktop computer, a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, which can be configured to communicate with server 110 over network 120, With respect to electronic device 170, electronic device 170 may include one or more processors 172, memory 174, a communication adapter 176, an input/output adapter 178, a display adapter 180, a user interface adapter 182, and a bus 184. As shown, each of one or more processors 172, such as a central processing unit (CPU), memory 174, communication adapter 176, input/output adapter 178, display adapter 180, and user interface adapter 182 are coupled to/via bus 184. As noted above, one or more components of electronic device 170 may also be included in one or more other devices, such as server 110, to enable and/or support operations and functionality at the other device.

One or more processors 172 may include a CPU or microprocessor, a graphics processing unit ("GPU"), microcontroller, or a combination thereof that has been programmed to perform the functions of electronic device 170. Implementations described herein are not restricted by the architecture of the one or more processors 172 so long as the one or more processors 172, whether directly or indirectly, supports the operations described herein. The one or more processors 172 may be one component or multiple components that may execute the various described logical instructions. The present disclosure is not restricted by the architecture of the one or more processors 172, as long as the one or more processors 172 supports modules, configurations, or operations as described herein. Further, as will be understood by those of skill in the art, a "module" can include an application-specific integrated circuit ("ASIC"), an electronic circuit, a processor (shared, dedicated, or group) that executes one or more of software or firmware, a combinational logic circuit, and/or other suitable components that provide the described functionality. In some implementations, a module is "[a] self-contained hardware or software component that interacts with a larger system." Alan Freedman, "The Computer Glossary" 268 (8th ed. 1998).

Memory 174 includes read only memory (ROM) 186 and random access memory (RAM) 188. ROM 186 may store configuration information for booting electronic device 170. ROM 186 can include programmable read-only memory (PROM), erasable programmable read-only memory (EPROM), electrically erasable programmable read-only memory (EEPROM), optical storage, or the like. Electronic device 170 may utilize RAM 188 to store the various data structures used by a software application. RAM 188 can include synchronous RAM (SRAM), dynamic RAM (DRAM), synchronous dynamic RAM (SDRAM), or the like. ROM 186 and RAM 188 hold user and system data, and both ROM 186 and RAM 188 may be randomly accessed. In some implementations, memory 174 may store the instructions that, when executed by one or more processor 172, cause the one or more processors 172 to perform operations according to aspects of the present disclosure, as described herein.

Communication adapter 176 can be adapted to couple electronic device 170 to a network, which can be one or more of a LAN, WAN, and/or the Internet. Therefore, in some implementations, server 110 may be accessed via an online portal. In some implementations, communication adapter 176 includes a transceiver configured to send and receive signals, such as electronic signals. Although described as a transceiver, communication adapter 176 may alternatively include a receiver, a transmitter, or both. In some implementations, communication adapter 176 includes a wireless interface such as a LoRa interface, a Wi-Fi interface (e.g., an IEEE 802.11 interface), a cellular interface, a Bluetooth interface, a BLE interface, a Zigbee interface, another type of low power network interface, or the like.

The I/O adapter 178 may couple electronic device 170 to one or more data storage devices 190, such as one or more of a hard drive, a solid state storage device, a flash drive, a compact disc (CD) drive, a floppy disk drive, a tape drive, and/or the like. Also, the one or more data storage devices 190 can be a separate server coupled to electronic device 170 through a network connection to I/O adapter 178. Display adapter 180 can be driven by one or more processors 172 to control presentation via display device 192. In some implementations, display adapter 180 may display a graphical user interface (GUI) associated with a software or web-based application on display device 192, such as a monitor or touch screen. User interface adapter 182 couples user interface device 194, such as a keyboard, a pointing device, and/or a touch screen to the electronic device 170. The I/O adapter 178, the user interface adapter 182, or both may, in certain implementations, enable a user to interact with electronic device 170. Any of devices 172-184 may be physical and/or logical.

The concepts described herein are not limited to the architecture of electronic device 170. Rather, electronic device 170 is provided as an example of one type of computing device that can be adapted to perform the functions of server 110 and/or a user interface device. For example, any suitable processor-based device can be utilized including, without limitation, personal data assistants (PDAs), computers, laptops, tablet computers, smartphones, computer game consoles, multi-processor servers, and the like, as illustrative, non-limiting examples. Moreover, the systems and methods of the present disclosure can be implemented on application specific integrated circuits (ASIC), very large scale integrated (VLSI) circuits, or other circuitry. Additionally, it should be appreciated that electronic device 170, or certain components thereof, may reside at, or be installed in, different locations within system 100.

In some implementations, server 110 can comprise one or more servers or a cloud-based computing platform configured to perform operations or execute the steps described herein. Accordingly, server 110 may include a particular purpose computing system designed, configured, or adapted to perform and/or initiate operations, functions, processes, and/or methods described herein and can be communicatively coupled with a number of end user devices (e.g., an electronic device 170), which can be, e.g., a computer, tablet, Smartphone, or other similar end user computing device, as illustrative, non-limiting examples. Users can interact with server 110 using a device via one or more networks, such as network 120, which itself can include one or more of a local intranet, a LAN (Local Area Network), a WAN (Wide Area Network), a virtual private network (VPN), and the like. Communicative coupling between different devices of system 100 can be provided by, e.g., one or more of wireless connections, a synchronous optical network (SONET) connection, a digital T1, TN, E1 or E3 line, Digital Data Service (DDS) connection, DSL (Digital Subscriber Line) connection, an Ethernet connection, and the like, as illustrative, non-limiting examples.

In some implementations, server 110 is configured to store member information 116 and group models 112. Each group model (e.g., data model) of group models 112 is associated with a different organization of a plurality of organizations and includes multiple group data structures, multiple group type data structures, and multiple group member data structures. Additionally, a first group model of group models 112 is associated with group hierarchy information 114 that indicates a hierarchy of one or more group data structures of the first group model. In some implementations, server 110 is configured to receive, from first entity 150, an access request 158 to access the first group model. Server 110 may sent, to first entity 150 and based on access request 158, first hierarchy information 117 associated with the first group model.

Figure 2:
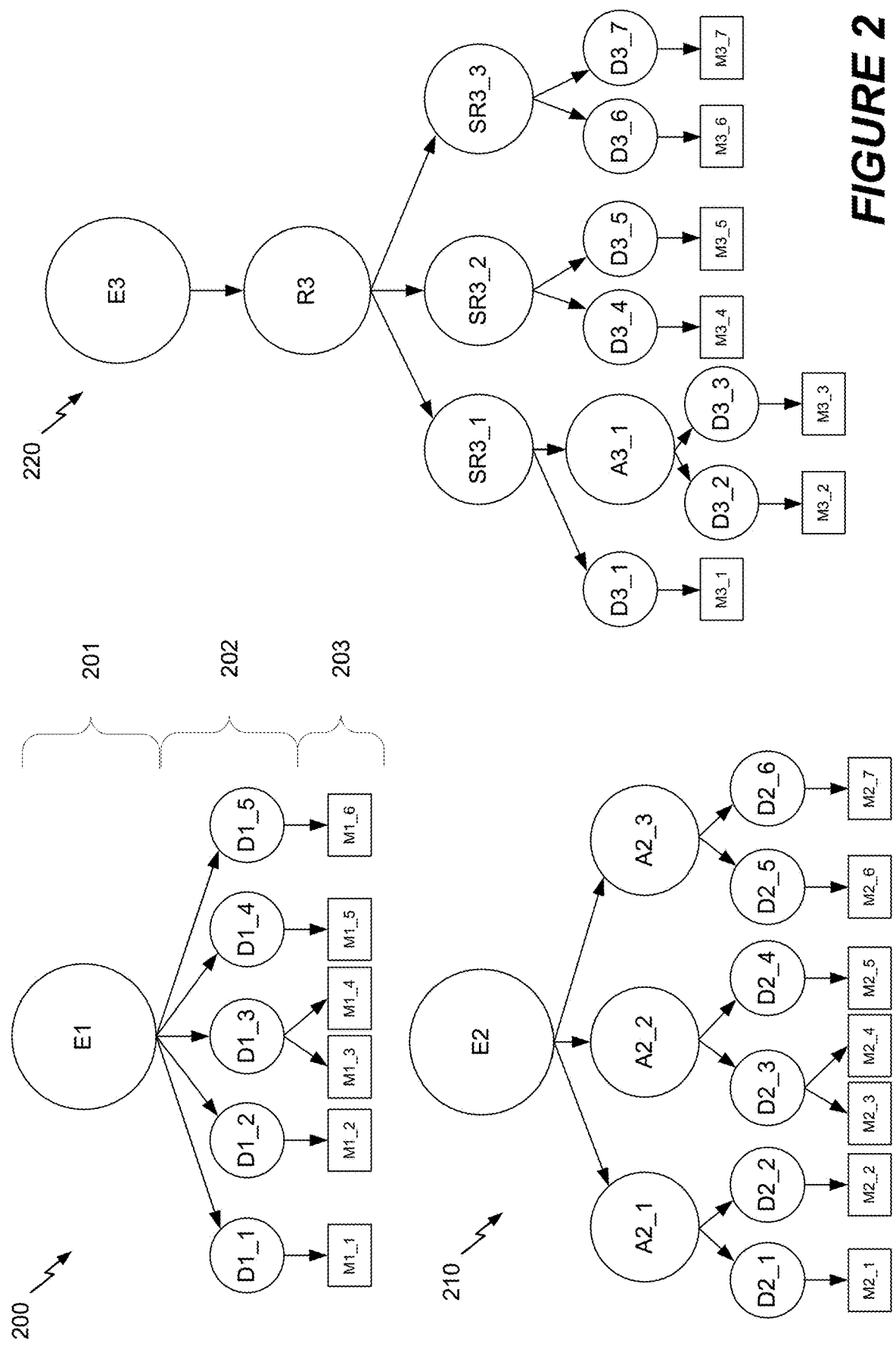
FIG. 2 is a diagram of examples of a different organizational hierarchies according to one or more aspects.

Referring to FIG. 2, a diagram of examples of a different organizational hierarchies is shown. For example, FIG. 2 includes a representation of a first organizational hierarchy 200, a representation of a second organizational hierarchy 210, and a representation of a third organizational hierarchy 220. First organizational hierarchy 200, second organizational hierarchy 210, or third organizational hierarchy 220 may be associated with group hierarchy information 114 or may be associated with an organization structure of first entity 150 or second entity 152.

First organizational hierarchy 200 is associated with a first entity E1, such as a first OEM. First entity E1 may be composed of one or more dealers. As shown, first entity E1 is composed of multiple dealers that include a first dealer D1_1, a second dealer D1_2, a third dealer D1_3, a fourth dealer D1_4, and a fifth dealer D1_5. Each dealer may include one or more members. In some implementations, a dealers may include no members. As shown in first organizational hierarchy 200, first dealer D1_1 is composed of a first member M1_1, second dealer D1_2 is composed of a second member M1_2, third dealer D1_3 is composed of a third member M1_3 and a fourth member M1_4, fourth dealer D1_4 is composed of a fifth member M1_5, and fifth dealer D1_5 is composed of a sixth member M1_6.

As shown with reference to first organizational hierarchy 200, first organizational hierarchy 200 may include one or more hierarchical levels, such as a first hierarchical level 201, a second hierarchical level 202, and third hierarchical level 203. With reference to first organizational hierarchy 200, first hierarchical level 201 is a highest level, second hierarchical level 202 is a second highest level, and third hierarchical level 203 is a lowest level. As shown, each hierarchical level is associated with a different group type. For example, first hierarchical level 201 is associated with an entity group type, second hierarchical level 202 is associated with a dealer group type, and third hierarchical level 203 is associated with a member group type. In other implementations, a hierarchical level may include multiple different group types.

Second organizational hierarchy 210 is associated with a second entity E2, such as a second OEM. Second entity E1 may be composed of one or more dealers. As shown, first entity E1 is composed of multiple groups that include a first area A2_1, a second area A2_2, and a third area A2_3. Each group may include one or more dealers. For example, first area A2_1 is composed of a first dealer D2_1 and a second dealer D2_2, second area A2_2 is composed of a third dealer D2_3 and a fourth dealer D2_4, and third area A2_3 is composed of a fifth dealer D2_5 and a sixth dealer D2_6. Each dealer may include one or more members. In some implementations, a dealers may include no members. As shown in second organizational hierarchy 210, first dealer D2_1 is composed of a first member M2_1, second dealer D2_2 is composed of a second member M2_2, third dealer D2_3 is composed of a third member M2_3 and a fourth member M2_4, fourth dealer D2_4 is composed of a fifth member M2_5, fifth dealer D2_5 is composed of a sixth member M2_6, and sixth dealer D2_6 is composed of a seventh member M2_7.

Third organizational hierarchy 220 is associated with a third entity E3, such as an OEM. Third entity E3 may be composed of one or more regions. As shown, third entity E3 is composed of a first region R3. Is some implementations, first region R3 may be associated with a country, a state, a country, or a city, as illustrative, non-limiting examples. First region R3 may be composed of one or more sub-regions, such as a first sub-region SR3_1, a second sub-region SR3_2, and a third sub-region SR3_3. In some implementations, first sub-region SR3_1 may be associated with an east region, second sub-region SR3_2 may be associated with a central region, and third sub-region SR3_3 may be associated with a west region. The sub-regions may be composed of one or more dealers or one or more groups (of one or more dealers). For example, first sub-region SR3_3 includes a first dealer D3_1 and a first area A3_1. The first area A3_1 is composed of a second dealer D3_2 and a third dealer D3_3. Second sub-region SR3_2 includes a fourth dealer D3_4 and fifth dealer D3_5. Third sub-region SR3_3 includes a sixth dealer D3_6 and a seventh dealer D3_7. multiple dealers that include a first dealer D1_1, a second dealer D1_2, a third dealer D1_3, a fourth dealer D1_4, and a fifth dealer D1_5. Each dealer may include one or more members. In some implementations, a dealers may include no members. As shown in third organizational hierarchy 220, first dealer D3_1 is composed of a first member M3_1, second dealer D3_2 is composed of a second member M3_2, third dealer D3_3 is composed of a third member M3_3, fourth dealer D3_4 is composed of a fourth member M3_4, fifth dealer D3_5 is composed of a fifth member M3_5, and sixth dealer D3_6 is composed of a sixth member M3_6, and seventh dealer D3_7 is composed of a seventh member M2_7.

It is noted that the organizational hierarchies 200, 210, 220 described with reference to FIG. 2 are for illustration and are not meant to be limiting. Accordingly, different hierarchies may be used with additional or fewer hierarchical levels (e.g., categories). For example, a first alternative organizational hierarchy may include an OEM, which is composed of one or more areas, with each area being composed of one or more districts, and each district being composed of one or more dealers, distributors, or sellers. As another example, a second alternative organizational hierarchy may include an OEM, which is composed of one or more regions, with each region being composed of one or more markets, with each market being composed on one or more dealership or distributor, and each dealership or distributor being composed of one or more retailers or sellers. As another example, a third alternative organizational hierarchy may include an OEM, which is composed of one or more regions, with each region being composed of one or more areas, with each area being composed of one or more dealers, distributors, or sellers. As another example, a fourth alternative organizational hierarchy may include an OEM, which is composed of one or more regions, with each region being composed of one or more areas, with each area being composed of one or more sub-areas, and each sub-area is composed of one or more dealers, distributors, or sellers.

In some implementations, a group (e.g., an dealer) is associated with multiple organizational hierarchies. For example, first dealer D1_1 and first dealer D2_1 may be the same dealer. Additionally, or alternatively, a member may be associated with multiple organizational hierarchies. For example, first member M3_1 may be associated with third organizational hierarchy 220 is associated with third entity E3 and may be associated with another organizational hierarchy that is specific to first dealer D3_1. The organizational hierarchy that is specific to first dealer D3_1 may include a plurality of members that include first member M3_1 and at least one member that is not included in third organizational hierarchy 220 is associated with a third entity E3.

Referring to FIG. 3, a block diagram of a system for management of one or more organizational hierarchies according to an implementation is shown as a system 300. System 300 may include or correspond to at least a portion of system 100. System 300 includes server 110, network 120, and storage device 370.

Server 110 includes a memory 310, one or more processors 350 (hereinafter referred to collectively as "processor 350"), a network interface 360, one or more application programming interfaces (APIs) (hereinafter referred to collectively as "API 362"), and a storage controller 364. Memory 310 may include ROM devices, RAM devices, one or more HDDs, flash memory devices, SSDs, other devices configured to store data in a persistent or non-persistent state, or a combination of different memory devices. Memory 310 includes (e.g., is configured to store) instruction 312, entity information 320, and management information 330.

Instructions 312 may be are executable by processor 350 to cause processor 350 to perform one or more perform functions, methods, processes, operations as described further herein. In some implementations, instructions 312 may include or be arranged as an application, such as application 314 associated with server 110. In some implementations, application 314 includes a software program, such as a web- and/or Internet-accessible software application. For example, application 314 may provide a portal via which one or more entities and/or users interact with and access server 110. Additionally, or alternatively, application 314 may be configured to interface with storage device 370.

Entity information 320 includes entity configuration information 322, group models 112, and group hierarchy information. Entity configuration information 322 include credential information 324 and user rights information 326. In some implementations, group models 112 are stored in a relationship database. Alternatively, group models 112 may be stored using a graph database.

Credential information 324 include login information to enable one or more users and/or one or more entities to access server 110. For example, credential information 324 may include a first credential for a first user associated with first entity 150 and a second credential for a second user associated with the second entity 152. User rights information 326 may include or indicate one or more access privileges, one or more restrictions, or a combination thereof, for a user or entity. For example, the one or more access privileges may grant a user access to a first set of information and the one or more restrictions may restrict access of a user to a second set of information. To illustrate, the one or more access privileges and/or the one or more restrictions may enable or restrict access to one or more data models, one or more groups or hierarchical levels of a data model, one or more members, one or more portions of management information, one or more date ranges, or a combination thereof, as illustrative, non-limiting examples. In some implementations, user rights information 326 may include first user rights information for the first user associated with first entity 150 and second user rights information for the second user associated with second entity 152.

Management information 330 may include member information 116, agreement information 332, fleet information 334, telematic information 336, and payment information 338, as illustrative, non-limiting examples. Agreement information 332 may include one or more rules, thresholds, or conditions associated with use of a member. In some implementations, agreement information 332 may be determined based on a contract or terms of use of a member, may indicate pricing, such as a cost or rate, of a member, or a combination thereof. Fleet information 334 may include, for one or more members, inspection information, preventative maintenance information, diagnostic trouble codes, repair turnover (e.g., downtime), odometer information, cost metrics, fuel information, cost of ownership information, utilization, parts and inventory, GPS information, telematics information (e.g., 336), accident or safety information, driver information, performance metrics, or a combination thereof. Telematic information 336 may include engine diagnostic information, maintenance alerts, an odometer reading, fuel consumption, idling time, location, speed, acceleration information, braking information, vehicle faults, mileage, fuel, GPS location, speed, a vehicle's internal behavior (e.g., air condition, door lock state, window open state), or a combination thereof, as illustrative, non-limiting examples. Payment information 338 may include or indicate one or more payments, such as a payment history, associated with a member.

Processor 350 may include may be a central processing unit (CPU_ or microprocessor, a graphics processing unit (GPU), a field-programmable gate array (FPGA) device, an application-specific integrated circuits (ASIC), another hardware device, a firmware device, a microcontroller, or any combination. As shown in FIG. 3, in an implementation, server 110 (e.g., processor 350) may include a manager 352, a model generator 354, and a user interface generator 356. In some implementations, processor 350 may include one or more modules. For example, each of manager 352, model generator 354, and user interface generator 356 may include or correspond to one or more modules. In an implementation, server 110 (e.g., processor 350 or modules 352, 354, 356) may be configured to execute one or more routines that perform various operations as described further herein. A module may comprise a machine- or machines-executable instructions. A module may also be implemented in programmable hardware devices such as field programmable gate arrays, programmable array logic, programmable logic devices or the like. Modules may also include software-defined units or instructions, that when executed by a processing machine or device, transform data stored on a data storage device from a first state to a second state. Modules may be separate or two or more may be combined.

In some implementations, one or more of modules (e.g., 352, 354, 356) may locally reside in memory 310 or in a separate location. Further, as will be understood by those of skill in the art, a "module" can include an application-specific integrated circuit ("ASIC"), an electronic circuit, a processor (shared, dedicated, or group) that executes one or more of software or firmware, a combinational logic circuit, and/or other suitable components that provide the described functionality.

Referring to processor 350, manager 352 may be configured to enable a user (e.g., 150) to manage one or more other components/modules (e.g., 354, 356) of processor 350. Additionally, or alternatively, manager 352 may enable storage of and/or access to entity information 320, management information 330, or a combination thereof. In some implementations, manager 352 includes a manager module that includes one or more routines, executable by one or more processors (e.g., the processor 172 of FIG. 1) to enable a user (e.g., 150, 152, 170) to manage one or more other components/modules (e.g., 354, 356) of processor 350 or to access entity information 320, management information 330, or a combination thereof, as described herein.

Model generator 354 may be configured to generate one or more data models (e.g., group models 112), group hierarchy information 114, or a combination thereof. Model generator 354 may be configured to enable execution of a route (e.g., a program) associated with an organization to populate one or more data structures to generate a data model that represents an organizational hierarchy of the organization. The data model may be configured to enable aggregation of management information 330 associated with the organization. For example, model generator 354 may be configure to perform one or more operations as described further herein at least with reference to FIG. 6. In some implementations, model generator 354 includes a model generator module that includes one or more routines, executable by one or more processors (e.g., the processor 172 of FIG. 1) to perform generation of one or more data models (e.g., group models 112), group hierarchy information 114, or a combination thereof, as described herein.

User interface generator 356 may be configured to generate information associated with a user interface or to enable generation of a user interface. For example, user interface generator 356 may be configured to generate an interface element as described further herein at least with reference to FIG. 8. In some implementations, user interface generator 356 includes a user interface module that includes one or more routines, executable by one or more processors (e.g., the processor 172 of FIG. 1) generate information associated with a user interface or to enable generation of a user interface, as described herein.

Network interface 360 may be configured to be communicatively coupled, via one or more networks (e.g., network 120) to one or more external devices, such as one or more of entities (e.g., first entity 150 or second entity 152), one or more members (e.g., first member 160 or second member 162, one or more storage device (e.g., storage device 370), or any combination thereof. For example, network interface 360 may include a transmitter, a receiver, or a combination thereof (e.g., a transceiver).

API 362, such as a software interface, may enable communication or access between server 110 and another device, such as first entity 150, second entity 152, first member 160, second member 162, or electronic device 170. Additionally, or alternatively, server 110 may host an engine or and application plug-in to enable a device, as first entity 150, second entity 152, first member 160, second member 162, or electronic device 170, to communicate with or access server 110.

In some implementations, API 362 includes a representational state transfer (REST) API configure to provide access to entity information 320, management information, or a combination thereof. Additionally, or alternatively, API 362 may be configured to enable a user device to receive hierarchy information, such as first hierarchy information 117, so that the user device an store the hierarchy information at a memory, such as a cache memory of the user device. Storage of the hierarchy information at the memory may enable the user device to build one or more user interface (UI) elements that reflect an organizational hierarchy associated with the hierarchy information. Additionally, or alternatively, storage of the hierarchy information at the memory may enable user device to generate reports or analytics based on member information associated with the organizational hierarchy as described further herein.

Storage controller 364 may be configured to communicate with and access storage device 370. Storage device 370 may include one or more memories accessible to processor 350. To illustrate, at least one memory may include or correspond to a database accessible to server 110, such as a database that stores at least a portion of instructions 312, entity information 320, management information 330, or a combination thereof. In some implementations, storage device 370 may include or be coupled to cloud storage such at least a portion of instructions 312, entity information 320, management information 330, or a combination thereof is stored at a cloud storage location and accessible by server 110. In some implementations, server 110 and/or storage device 370 are configured to create a back-up (full and/or partial back-up) of data, such as at least a portion of instructions 312, entity information 320, management information 330, or a combination thereof.

Figure 4:
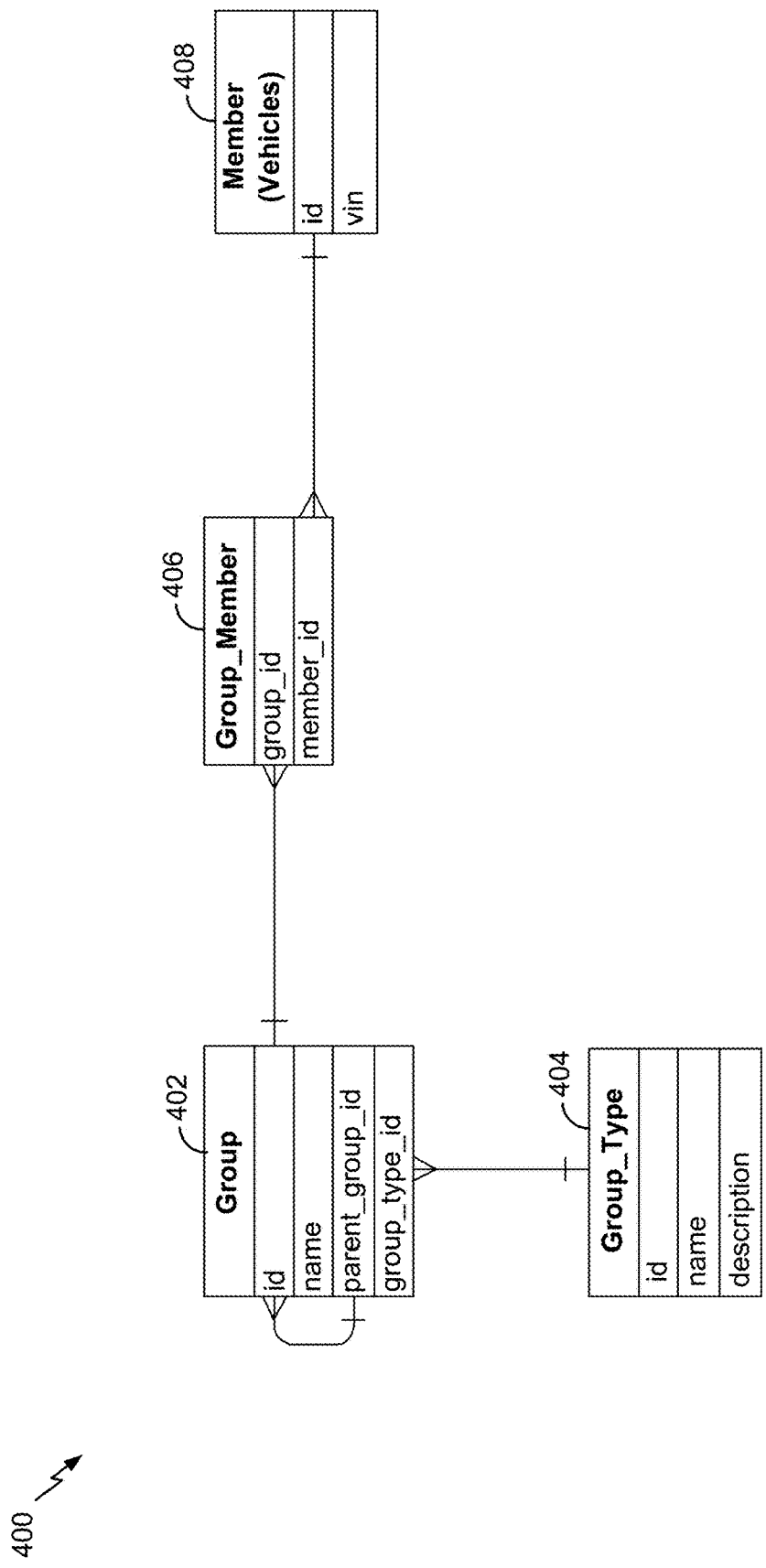
FIG. 4 is a diagram that illustrates a first example of a data model pattern according to one or more aspects.
Figure 5:
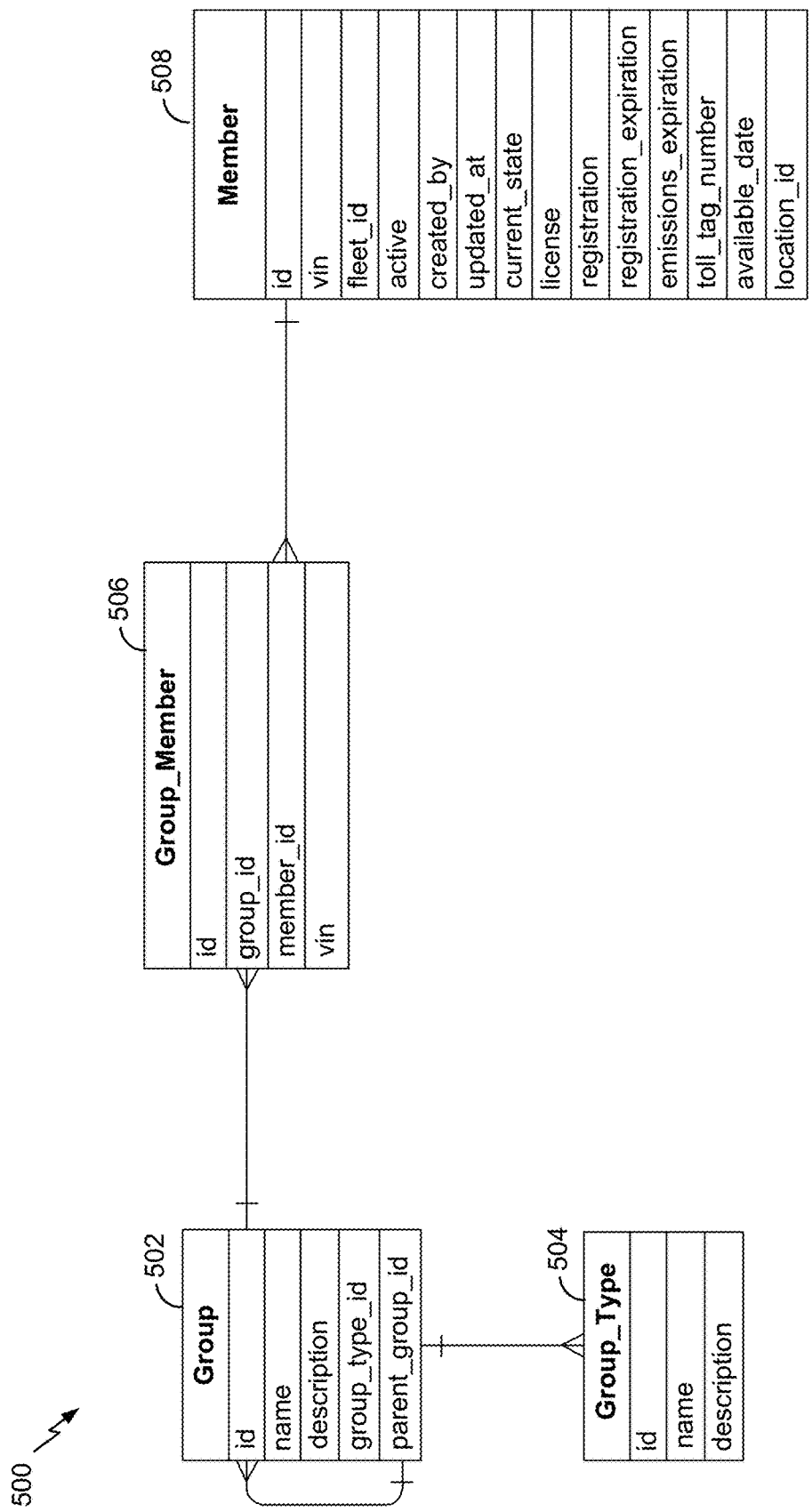
FIG. 5 is a diagram that illustrates a second example of a data model pattern according to one or more aspects.

Referring to FIGS. 4 and 5, examples of data model patterns according to one or more aspects. For example, FIG. 4 is a diagram that illustrates a first example of a data model pattern 400 and FIG. 5 is a diagram that illustrates a second example of a data model pattern 500. A data model pattern (e.g., 400 or 500) is configured to support different organizational structures for reporting when those structures are disjoint and not strict hierarchies, such as hierarchies of different organizations. As descried with reference to FIGS. 4 and 5 a group may be composed of one or more other groups, one or more members, or a combination thereof. Additionally, a member can be part of more than one group and can be an arbitrary entity or unit, such as a vehicle.

Referring to FIG. 4, data model pattern 400 includes a plurality of data structures. In a particular implementation, data model pattern 400 includes a group data structure 402 ("Group"), a group type data structure 404 ("Group_Type"), a group member data structure 406 ("Group_Members"), and a member data structure 408 ("Members"). In other implementations, data model pattern 400 may include fewer than four or more than four data structures.

Each of the data structures 402-408 include one or more fields and contain information. For example, group data structure 402 may include a group ID field ("group_id") indicating a unique group ID, a name field ("group_name") indicating a group name, a parent group ID field ("parent_group_id") indicating a parent group ID, if present, of the group ID, and a group type id field ("group_type_id") indicating a group type ID of the group ID. The patent group ID field may reference or include a value of a group ID field of another group data structure, such that the group data structure 402 and the other group data structure are linked. The group type ID field may reference or include a value of a group type ID field of group type data structure 404, such that the group data structure and group type data structure 404 are linked.

Group type data structure 404 may include an ID field ("group_type_id") indicating a unique group type ID, a name field ("group_type_name") indicating a group type name, and a description field ("description") including or indicating a description of the group type associated with the group type data structure 404.

Group member data structure 406 may include a group ID field ("group_id") and a member ID field ("member_id"). The group ID field of group member data structure 406 may reference or include a value of the group ID field of group data structure 402. The member ID field of group member data structure 406 may reference or include a value of a member ID field of member data structure 408, such that the group member data structure 406 and member data structure 408 are linked. In some implementations, the member ID field may include no value, or may include one or more values.

Member data structure 408 may be associated with a member, such as a vehicle, and may include a member ID field ("member_id") indicating a unique ID value and a VIN field ("yin") indicating a VIN. It is noted that a value of a member ID field of member data structure 408 can be part of more than one group, such that multiple group member data structures 406 include the same value in the member ide field of the group member data structures 406. As described herein, members include vehicles; however, in other implementations, members can be another entity. In some implementations, member data structure 408 may include or correspond to member information 116. Additionally, or alternatively, member data structure 408 may include one or more fields that includes information included in or that references management information 330, such as member information 116, agreement information 332, fleet information 334, telematics information 336, payment information, or a combination thereof.

Referring to FIG. 5, data model pattern 500 includes a plurality of data structures. In a particular implementation, data model pattern 500 includes a group data structure 502 ("Group"), a group type data structure 504 ("Group_Type"), a group member data structure 506 ("Group_Members"), and a member data structure 508 ("Members"). In other implementations, data model pattern 500 may include fewer than four or more than four data structures.

Each of the data structures 502-508 include one or more fields and contain information. For example, group data structure 502 may include a group ID field ("group_id") indicating a unique group ID, a name field ("group_name") indicating a group name, a parent group ID field ("parent_group_id") indicating a parent group ID, if present, of the group ID, and a group type id field ("group_type_id") indicating a group type ID of the group ID. The patent group ID field may reference or include a value of a group ID field of another group data structure, such that the group data structure 502 and the other group data structure are linked. The group type ID field may reference or include a value of a group type ID field of group type data structure 504, such that the group data structure and group type data structure 504 are linked.

Group type data structure 504 may include an ID field ("group_type_id") indicating a unique group type ID, a name field ("group_type_name") indicating a group type name, and a description field ("description") including or indicating a description of the group type associated with the group type data structure 504.

Group member data structure 506 may include a group members ID field ("group_members_id") indicating a unique group members ID, a group ID field ("group_id"), a member ID field ("member_id"), and a VIN field ("yin") indicating a VIN. The group ID field of group member data structure 506 may reference or include a value of the group ID field of group data structure 502. The member ID field of group member data structure 506 may reference or include a value of a member ID field of member data structure 508, such that the group member data structure 506 and member data structure 508 are linked. In some implementations, the member ID field may include no value, or may include one or more values. The VIN field may include a value that corresponds to a value of the member ID field and is the same a value of a VIN field of a member data structure 508 that includes the same value of the member ID field.

Member data structure 508 may be associated with a member, such as a vehicle, and may include a member ID field ("member_id") indicating a unique ID value, a VIN field ("vin") indicating a VIN, a fleet ID field ("fleet_id") indicating a fleet data structure, such as fleet information 334, or an entry in the fleet data structure, a status field ("active") indicating an active status or an inactive status, a created by field ("created_by") indicating a user or entity that associated with creation of the member data structure or of the vehicle, a current state field ("current_state") indicating a state, a status, or an availability of the vehicle (e.g., rented, staged, disposed, maintenance, in-prep, shuttle, hard-hold, in-port or transit, in pre-delivery inspection, damaged, or totaled-pending-insurance), a license field ("license") field indicating whether or not the vehicle is licensed, a registration field ("registration") indicating a state in which the member is registered, a registration expiration flied ("registration_expiration") indicating a date of expiration of the registration of the vehicle, an emissions expiration field ("emissions_expiration") indicating a date of expiration of a valid admissions test, a toll tag number field ("toll_tag_number") indicating an toll tag number or a toll account number associated with the vehicle, an available date field ("available_date") indicating a date when the vehicle is scheduled to be available for use, and a location ID field ("location_id") indicating a location, such as a GPS location, associated with the vehicle.

As shown in FIG. 5, the VIN field is include in both group member data structure 506 and member data structure 508. Having the VIN field in both data structures creates redundant (e.g., repetitive) data in the data structures; however, having the VIN filed in the group member data structure 506 enables VIN information to be included in hierarchical information, such as first hierarchy information 117, that may be provided to a user device. The value of the VIN field may be returned by queries on a regular basis to the user device such that including the value of the VIN field in group member data structure 506, and thus the hierarchical information, provides system efficiency by not have to access one or more member data structures 508 on a regular basis to obtain such information.

It is noted that a value of a member ID field of member data structure 508 can be part of more than one group, such that multiple group member data structures 506 include the same value in the member ID field of the group member data structures 506. As described herein, members include vehicles; however, in other implementations, members can be another entity. In some implementations, member data structure 508 may include or correspond to member information 116. Additionally, or alternatively, member data structure 508 may include one or more fields that includes information included in or that references management information 330, such as member information 116, agreement information 332, fleet information 334, telematics information 336, payment information, or a combination thereof.

In some implementations, one or more data structures may include additional data or fields, may not include one or more described data or fields, or a combination thereof. Additionally, or alternatively, one or more data structures, or portions thereof, may be combined or broken up into separate data structures.

In some implementations, the data model patterns of FIGS. 4 and 5 may include one or more additional data structures. For example, the data model patterns of FIG. 4 or 5 may include a member type data structure that includes a member type group id field, a name field and a description filed. The member type group id field may include a value that is linked to one or more member data structures (e.g., to a member type id filed included in a member data structure), the name field may describe indicating a member type name, and the description field may include or indicate a description of the member type. As an illustrative example, a first member type data structure may be associated with a car, a second member type data structure may be associated with a truck, a third member type data structure may be associated with a boat, and a fourth member type data structure may be associated with an employee. Use of one or more additional data structures, such as a member type data structure, may provide additional flexibility and management functions associating with a data model of an organization.

Additionally, or alternatively, the data model patterns of FIGS. 4 and 5 may not include one or more data structures. For example, the data model patters of FIGS. 4 and 5 may not include a member data structure.

Figure 6:
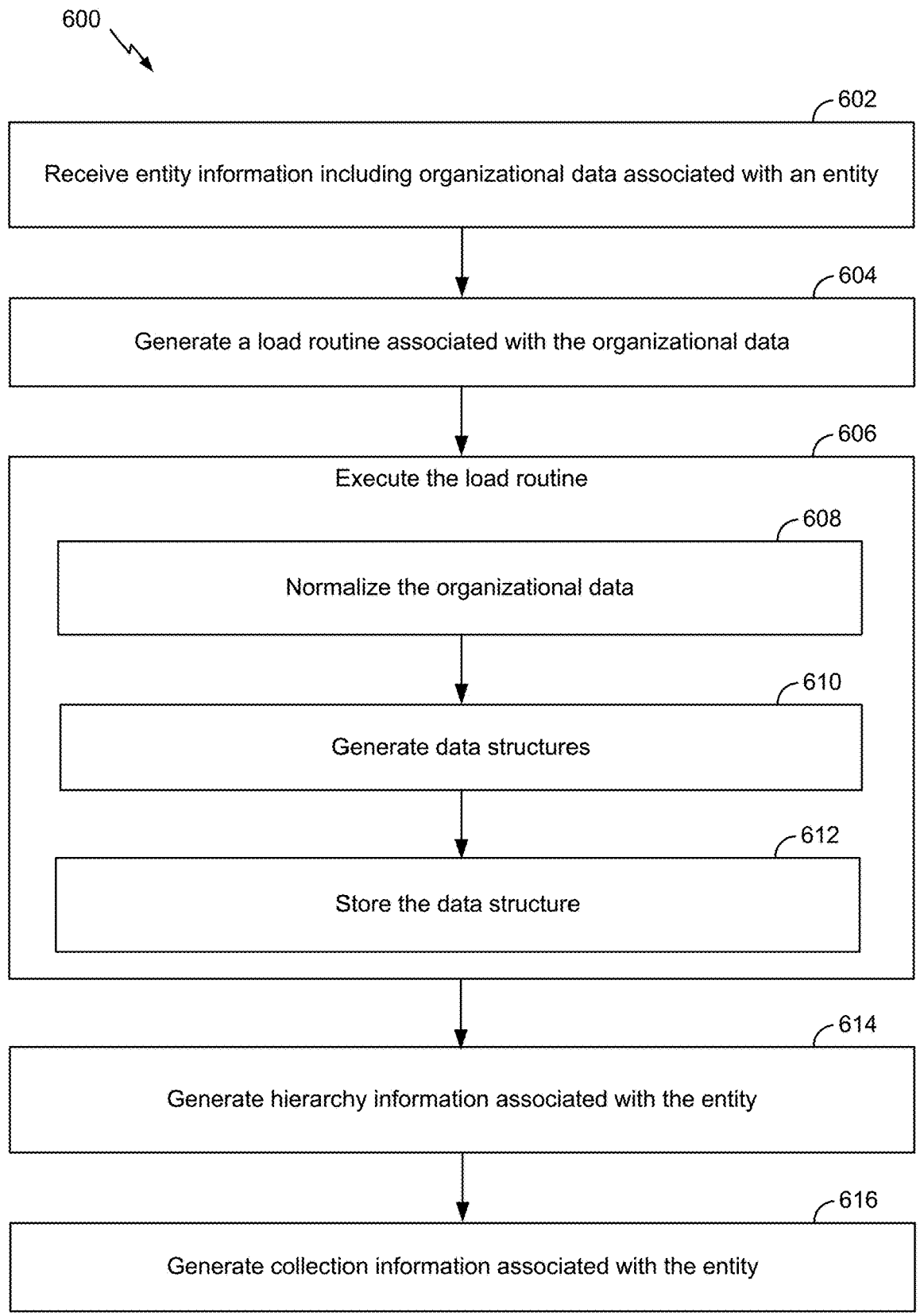
FIG. 6 is a flow diagram illustrating an example process that supports population of a data model according to one or more aspects.

FIG. 6 is a flow diagram illustrating an example process 600 that supports population of a data model according to one or more aspects. In some implementations, the data model may be associated with an organization hierarchy of an OEM. Operations of the process 600 may be performed by a server, such as the server 110 described above with reference to at least FIGS. 1 and 3. For example, example operations (also referred to as "blocks") of the process 600 may enable the server 110 to population of a data model. The data model may include or correspond to one of group models 112, a data model based on data model pattern 400, or a data model based on data model pattern 500, as illustrative, non-limiting examples.

In block 602, the server receives entity information including organizational data associated with an entity. The organizational data may include or correspond to entity configuration information 322, management information 330, or a combination thereof. The server may store the organizational data at a memory, such as memory 310 or storage device 370. In some implementations, the organizational data includes one or more records of an entity, such as one or more records of one or more hierarchical groups of the entity. For example, the hierarchical groups may include or indicates a region, an area, a dealer, etc. Additionally, the one or more records may indicated a hierarchical relationship between different groups, such as relationships described with reference to FIG. 2. For example, a hierarchical relationship may indicate that a first group is a parent of a second group—i.e., the second group is subordinate to the first group.

In block 604, the server generates or stores a load routine associated with the organizational data. The server may store the load routine at a memory, such as memory 310 or storage device 370. In some implementations, the load routine may be generated by an administrator or agent of the server or the entity, as illustrative, non-limiting examples.

In block 606, the server executes the load routine. As part of execution of the load routine, in block 608, the server normalizes the organizational data. The server may execute the load program response to an instruction received from an administrator of the server or from an entity, or based on programmed time of execution, as illustrative, non-limiting examples.

As part of execution of the load routine, in block 610, the server generates data structures. To illustrate, the server may generate the data structures based on or according to a data model pattern, such as data model pattern 400 or data model pattern 500, as illustrative, non-limiting examples.

As part of execution of the load routine, in block 612, the server stores the data structures. The server may store the data structures as a group model, such as one of group models 112. The server may store the data structures at a memory, such as memory 310 or storage device 370.

In block 614, the server generates hierarchy information associated with the entity. The hierarchy information may include or correspond to group hierarchy information 114, such as first hierarchy information 117. In some implementations, the hierarchy information may be generated based on a recursive query performed on the stored data structures. The recursive query is described further herein at least with reference to FIG. 7. The hierarchy information may indicate, for each group included in an organizational hierarchy, a name of the group, a group ID of the group, a group type of the group, a parent group of the group, or a combination thereof.

In block 616, the server generates collection information associated with the entity. The collection information may include or correspond to first collection information 118. The collection may include a compilation (e.g., an aggregation) of member information (e.g., 116) of one or more members associated with the data model.

It is noted that one or more operations described with reference to process 600 may be combined or omitted. For example, process 600 may not include generation of the collection information at 616. Additionally, although operations are shown and described in a particular order, one or more operations may be performed in a different order or in parallel. Accordingly, process 600 is intended to provide an illustrative example and is not intended to be limited to the specific example shown and described. Similarly, while operations are depicted in the drawings in a particular order, this should not be understood as requiring that such operations be performed in the particular order shown or in sequential order, or that all illustrated operations be performed, to achieve desirable results. Can be performed in parallel, may be optional, or may not be performed.

Thus, FIG. 6 demonstrates population of a data model. Generation of the data model may occur according to a data model pattern for any kind of multi-level organizational hierarchy. Accordingly, data models for different organizations may be represented in a uniform and consistent manner that provides efficient storage, management, use of the data models, and improved and efficient operation of server that stores and maintains the data models.

FIG. 7 is an illustrative example of hierarchy information 700 associated with a data model according to one or more aspects. Hierarchy information 700 may include or correspond to first hierarchy information 117. Hierarchy information 700 may be determined based on a first data model of one or more group models 112. As shown in FIG. 7, the hierarchical information is represented as a table; however, other data structures may be used.

Hierarchy information 700 includes multiple columns, such as a first column 702, a second column 704, a third column 706, and a fourth column 708. As shown, hierarchy information 700 includes a header row 710. Header row 710 designates that first column 702 indicates a name (Name), second column 704 indicates a group ID (Group_ID), third column 706 indicates a group type (Group_Type), and fourth column 708 indicates a parent group (Parent_Group). Hierarchy information 700 also includes one or more rows, such as a representative first row 711 and a representative second row 712.

First row 711 is associated with a first group, such as a highest group, of an organizational hierarchy associated with the hierarchy information 700. To illustrate, each other entry in hierarchy information 700 is associated with a different group that is subordinate, directly or indirectly, to the first group. The first group is subordinate to no other group. First row 711 indicates that the first group has a Name of "Entity_1", a Group_ID of "1_1", a Group_Type of "OEM", and no Parent_Group.

Second row 712 is associated with a second group of the organization hierarchy and is directly subordinate to the first group. Stated differently, first group is composed of second group. Second row 712 indicates that the second group has a Name of "Region_1NE", a Group_ID of "1_2", a Group_Type of "Region", and a Parent_Group of "OEM".

In some implementations, server 110 may perform one or more operations to generate hierarchy information 700 from one or more data structures of a group model. As shown, hierarchy information 700 may represent one or more operations to retrieve all groups for name value of "Entity_1" or group ID value of "1", which may be arranged in a hierarchical order. In some implementations, hierarchy information 700 may include additional information (e.g., columns) or additional entries. For example, an additional column may indicates a number of members included in an entry. Additionally, or alternatively, additional entries may be included to list one or more members.

In some implementations, server 110 may perform one or more operations, such as execution of a query, to generate hierarchy information 700, or a portion thereof, from one or more data structures of a group model. As an illustrative example of execution of a query for a data model generated based on data model pattern 500, one or more operations may use group data structure 502, value "id" to generate hierarchy information 700. Group data structure 502, value "id" may be used to drive the query because the "id" values are unique, unlike value "name" of group data structure 502, which may be duplicated.

In some implementations, server 110 may support one or more queries of a data model. Each of the one or more queries may be performed via an API process, such as an API process associated with API 362. A first query may be configured to return all sub-groups of a first group of a tree-like organizational hierarchy structure. For example, the first query may be named "all_groups(group_id: int)" which is configured to, for a given group data structure "id" value, i.e., a "group_id", which is an integer (int) value, return all sub-groups of the "group_id". A second query may be configured to return all sub-groups of a first group of a tree-like organizational hierarchy structure and member information for each returned group/sub-group. For example, the first query may be named "all_members (group_id: int)" which is configured to, for a given group data structure "id" value, i.e., a "group_id", which is an integer (int) value, return all sub-groups of the "group_id" and all members of the returned groups/sub-groups.

FIG. 8 is a block diagram of an example of a system 800 for management of one or more organizational hierarchies according to one or more aspects. In some examples, system 800 may implement aspects of the system 100 or system 300. System 800 includes server 110, network 120, first entity 150, second entity 152, and first member 160. Although one server 110, two entities, and two members are illustrated, in some other implementations, system 800 may generally include multiple servers 110, one or more entities, and one or more members (e.g., 160).

Server 110 includes processor 350, memory 310, and API 362. Processor 350 includes manager 352. Memory includes instructions 312, entity information, and management information 330. Instructions 312 may include one or more applications 314 (hereinafter referred to collectively as "application 314"). Entity information 320 includes entity configuration information 322, group models 112, and group hierarchy information 114. Group hierarchy information 114 includes first hierarchy information 117 and first collection information 118. Management information 330 includes member information 116.

First entity 150 can include a variety of components (such as structural, hardware components) used for carrying out one or more functions described herein. For example, these components can include one or more processors 812 (hereinafter referred to collectively as "processor 812"), one or more memory devices 814 (hereinafter referred to collectively as "memory 814"), and one or more interface 818 (hereinafter referred to collectively as "interface 818"). Processor 812 may be configured to execute instructions stored in memory 814 to perform the operations described herein. In some implementations, processor 812 includes or corresponds to processor 172.

Memory 814 includes or is configured to store an application 816. Application 816 may include or correspond to application 314. In some implementations, memory 814 may be configured to stored information or data received from server 110. In some such implementations, memory 814 may include multiple memories, at least one of which is configured as a cache memory. In some implementations, memory includes or corresponds to memory 174.

Interface 818 may include a transmitter configured to transmit reference signals, control information and data to one or more other devices, and a receiver configured to receive references signals, synchronization signals, control information and data from one or more other devices. For example, the transmitter may transmit signaling, control information and data to, and the receiver may receive signaling, control information and data from, server 110, first member 160, or a combination thereof. In some implementations, interface 818 may include one or more transceivers in which the transmitter and the receiver are integrated. Additionally or alternatively, interface 818 may include or correspond to communication adapter 176.

Second entity 152 can include a variety of components (such as structural, hardware components) used for carrying out one or more functions described herein. For example, second entity 152 may include one or more components as described with reference to first entity 150, electronic device 170, or a combination thereof.

First member 160 can include a variety of components (such as structural, hardware components) used for carrying out one or more functions described herein. For example, first member 160 may include one or more components as described with reference to first entity 150, electronic device 170, or a combination thereof.

During operation of system 800, first entity 150 sends a first access request 840 to server 110. First access request 840 is configured to or associated with a request to access a first group model of group models 112. The first group model may be associated with or correspond to first entity 152. Access of the first group model may include access of first hierarchy information 117, first collection information 118, member information 116, or a combination thereof. In some implementations, first access request 840 may include login information associated with first entity 150 or a user of first entity 150.

Server 110 receives first access request 840 and processes first access request 840. In some implementations, based on first access request 840, server 110 may identify and access first hierarchy information 117, first collection information 118, member information 116, or a combination thereof. In some implementations, server 110 may generate first hierarchy information 117, first collection information 118, or both, based on first access request 840. Additionally, or alternatively, server 110 may validate the login information included in first access request 840. For example, server 110 may access entity information 320, such as credential information 324, and perform a comparison based on the login information and entity information 320 (e.g., credential information 324).

Server 110 sends first hierarchy information 842 to first entity 150. Server 110 may send first hierarchy information 842 responsive to first access request 840. First hierarchy information 842 may include or correspond to first hierarchy information 117. In some implementations, server 110 may also send a portion or an entirety of first collection information 118 to first entity 150 in addition to first hierarchy information 842. Additionally, or alternatively, server 110 may send first analysis data generated by server 110 based on first hierarchy information, first collection information 118, or both, to first entity 150.

First entity 150 may receive first hierarchy information 842 and store first hierarchy information at memory 814. In some implementations, first entity may store first hierarchy information 842 at a cache memory.

First entity 150 sends a data request 844 to server 110. Data request 844 may include an ID, such as a group ID 845, a group type ID, a member ID, or a combination thereof. For example, first entity 150 may determine the ID based on the first hierarchy information stored at memory 814. Although data request 844 is described as including the group ID 845, in other implementations, data request 844 may not include group ID 845 or another idea. In some implementations, first entity 150 may determine an ID and/or other information to be included in the request based on or in response to an input received via a selectable option presented via an interface, as described further herein at least with reference to FIGS. 12-23. The other information may include an indication of a type of data requested, a time period of data requested, a download operation request, a search term, or a combination thereof, as illustrative non-limiting examples.

Server 110 receives data request 844 and generate a first interface element 846 based on or responsive to data request 844. In some implementation, first interface element 846 may include a portion or an entirety of first collection information 118, management information 330, such as member information 116, or a combination thereof. To illustrate, to generate first interface element 846, server 110 may identify data, such as a portion of first collection information 118 that is associated with or included in a group that corresponds to group ID 845, a group that is subordinate to the group that corresponds to group ID 845, or a combination thereof. Additionally, or alternatively, server 110 may also restrict at least a portion of the data based on access restrictions associated with first entity 150 or a user of first entity 150. Server 110 may include such data in first interface element 846 and send first interface element to first entity 150. In some implementations, sever 110 may perform analytics on first collection data to generate information associated with one or more metrics, such as one or more metrics described further herein at least with reference to FIGS. 12-23. First entity 150 may receive first interface element 846 and may generate or initiate generation of a display, such as a GUI, based on the data included in or associated with first interface element 846.

In addition to communication between server 110 and first entity 150, server 110 may communicate with second entity 152. For example, server 110 may receive a second access request 850 from second entity 152 and may send second hierarchy information 852 (included in group hierarchy information 114) to second entity 152. Second access request 850 may include or correspond to first access request 840, and second hierarchy information 852 may include or correspond to first hierarchy information 842. Additionally, server 110 may receive one or more requests, such as one or more data requests 844, from second entity 152 and may sent one or more interface elements to second entity 152.

In some implementations, first member 160 may be configured to send first member information 854 to server 110. Server 110 may update management information 330, such as member information 116, based on first member information 854. In some implementations, first member 160 may send first member information 854 to server 110 via first entity 150. For example, first member 160 may send first member information 854 to first entity 150 and first entity 150 may send membership information update 858 to server 110. Membership information update 858 may include first member information 854, management information to be stored at or update management information 330 (such as membership information 116, agreement information 332 (e.g., contract information), or other information), or a combination thereof, as illustrative, non-limiting examples. In some implementations, first entity 150 may sent membership information update 858 independent of or without receiving first member information 854.

In some implementations, managing member information (e.g., 116) associated with an organization hierarchy includes server 110 storing member information 116 and a one or more models, such as one or more group models 112. Each model of the one or more models is associated with a different organization of one or more organizations. Additionally, or alternatively, each model of the one or more model includes one or more group data structures, one or more group type data structures, and one or more multiple group member data structures. Managing the member information (e.g., 116) also includes server 110 receiving, from first entity 150, first access request 840 to access a first group model of the one or more group models 112. The first group model is associated with a first organization of the one or more organizations. Managing the member information (e.g., 116) further includes server 110 sending, to first entity 150 and based on first access request 840, first hierarchy information 842 associated with the first group model.

In some implementations, accessing member information (e.g., 116) from server 110 storing multiple organization hierarchies include first entity 150 transmitting, to server 110, first access request 840 to access a first group model of one or more models, such as one or more group models 112) stored at server 110. Server 110 is also configured to store member information 116. The multiple organization hierarchies include or correspond to group models 112, group hierarchy information 114, management information 330, or a combination thereof. The first group model is associated with a first organization of one o or more organizations. Each group model of the one or more models includes one or more group data structures, one or more group type data structures, and one or more group member data structures.

Each group model of the one or more models is associated with group hierarchy information that indicates a hierarchy of the one or more group data structures associated with the group model. Accessing member information (e.g., 116) from server 110 also includes first entity 150 receiving, based on first access request 840, first hierarchy information 842 associated with the first group model.

As described with reference to FIG. 8, the present disclosure provides techniques for management of member information associated with multiple organizational hierarchies. For example, the techniques enable improved management of members at any level of the organization hierarchy. By using group models 112 based on the same data model pattern, a same set of tools to each data model may be used with first entity 150 and second entity 152 to provide reporting and analytics for multiple organizations. Additionally, the data models based on the same data model pattern enables metrics for and between different organizations to be easily analyzed and compared such that member usage optimization across the multiple organizations can be identified. Additionally, the techniques enable efficient management, reporting, and analytics for large data sets. For example, group models 112 described herein may be used to generate hierarchical information (e.g., 117) of an organizational hierarchy that is small in size than an amount of member information (e.g., 116) associated with the organizational hierarchy. The hierarchical information (e.g., 117) may be efficiently provided to a device, such as first entity 150, second entity 152, or electronic device 170 associated with an organization. In some implementations, the hierarchical information (e.g., 117) may be used as a navigational element for the device to access the member information (e.g., 116).

Figure 9:
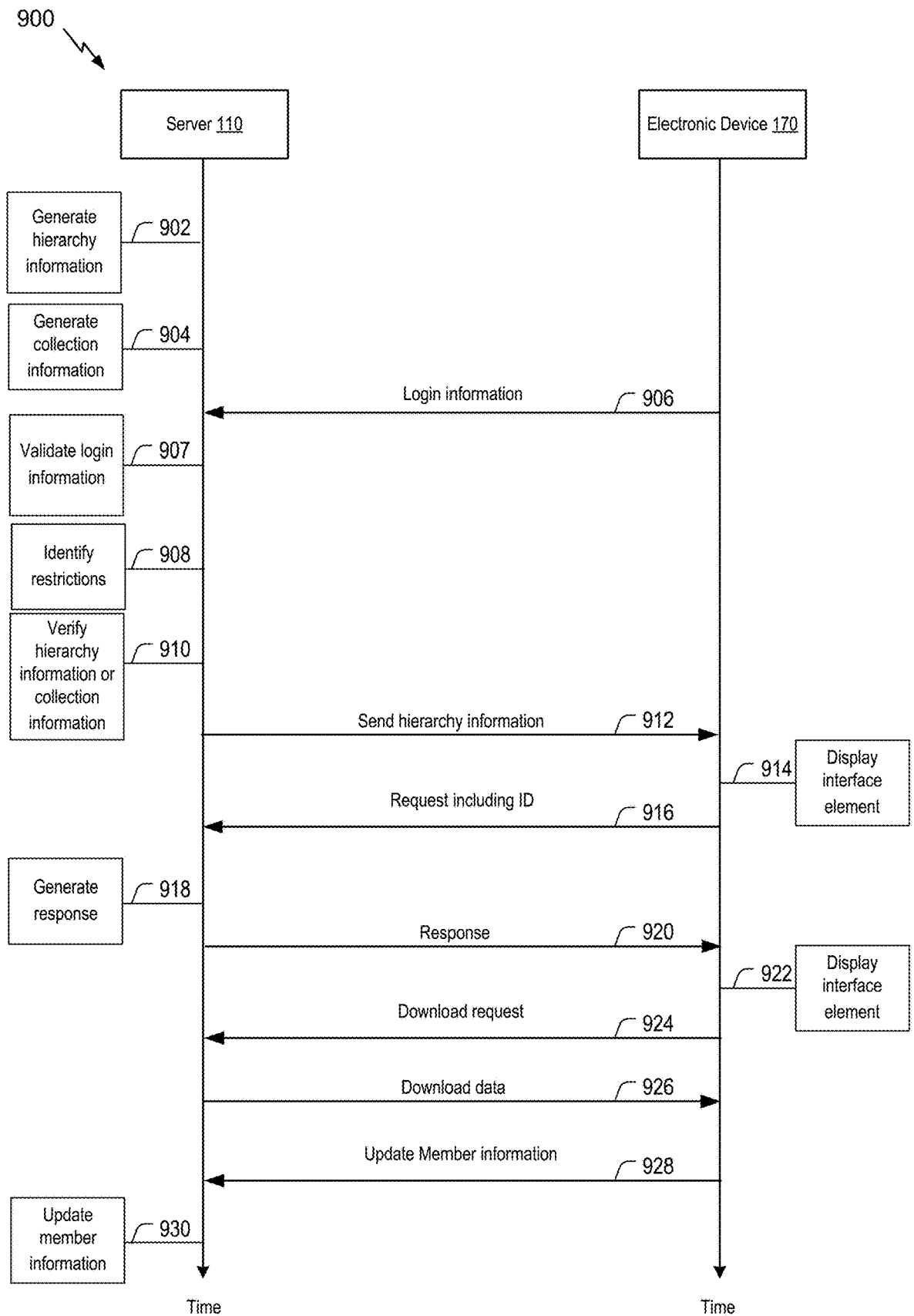
FIG. 9 is a ladder diagram to illustrate an example of management of one or more organizational hierarchies according to one or more aspects.

Referring to FIG. 9, a ladder diagram illustrating an example of management of one or more organizational hierarchies is depicted and generally designated 900. The ladder diagram 900 includes or corresponds to system 100, 300, or 800. As shown, a system of ladder diagram 900 includes server 110 and electronic device 170. In some implementations, electronic device 170 may include or correspond to first entity 150 or second entity 152.

In some implementations, electronic device 170 may generate and initiate display of or display a GUI to enable a user to initiate or perform some of the operations described herein. Examples of one or more GUIs (e.g., one or more interface outputs) are described further herein at least with reference to FIGS. 11-23.

During operation, at 902, server 110 generates hierarchy information. The hierarchy information may include or correspond to group hierarchy information 114, first hierarchy information 117, hierarchy information 700, or a combination thereof. At 904, server 110 generates collection information. The collection information may include or correspond to first collection information 118. Generation of the hierarchy information, the collection information, or a combination thereof, may include or correspond to one or more operations as described with reference to at least FIG. 6.

Electronic device 170 may initiate a login procedure with server 110 and send login information to server 110, at 906. The login information may be associated with electronic device 170, a user of electronic device 170, or a combination thereof. The login information may include a user ID, a password, an entity ID, or a combination thereof. In some implementations, the login procedure may be a multi-factor authentication procedure.

Server 110 may validate the login information, at 907. For example, server 110 may access entity information 320, such as credential information 324, and perform a comparison based on the login information and entity information 320 (e.g., credential information 324). To illustrate, server 110 may validate the login information based on a result of the comparison indicating that the login information matches credential information 324. In the event that server 110 fails to validate the login information, server 110 may send an indication of an unsuccessful login to electronic device 170, an entity associated with the unsuccessful login, or a combination thereof.

After validation of the login information (e.g., a determination of a successful login), server 110 may identify one or more restrictions associated with electronic device 170 or a user of electronic device 170, 908. The one or more restrictions may include or correspond to user rights information 326. Server 110 may apply the one or more restrictions during interactions between server 110 and electronic device 170, such as one or more interactions as described herein.

Additionally, after validation of the login information, server 110 may verify the hierarchy information, the collection information, or both, is up-to-date, at 910. For example, server 110 may determine whether any changes or updates have been made to a group model associated with one or more entities accessible based on the successful login procedure, the identified one or more restrictions, or a combination thereof. Additionally, or alternatively, server may determine whether any changes or updated have been made to management information, such as management information 330. Based on a determine that a change or update has been made, server 110 updates the respective hierarchy information, collection information, or both.

Server 110 sends the hierarchy information to electronic device 170, at 912. In some implementations, server 110 may also send a portion or an entirety of the collection information to electronic device 170 in addition to the hierarchy information. Additionally, or alternatively, server 110 may send first analysis data generated by server 110 based on the hierarchy information, the collection information, or both, to electronic device 170.

Electronic device 170 displays, or initiates display of, a first interface element, such as a GUI, at 914. The first interface element may include or correspond to one or more outputs (e.g., an interface output) as described further herein at least with respect to FIGS. 11-23. The first interface element may be based on the hierarchy information, the collection information, the first analysis data, or a combination thereof. In some implementations, electronic device 170 may generate second analysis data based on the hierarchy information, the collection information, the first analysis data generated by server 110, or a combination thereof. The first interface element may include one or more selectable options configured to receive an input, such as a user input. The input may include or correspond to a request associated with the hierarchy information. For example, electronic device 170 may generate a request based on or in response to the input. The request may include or correspond to data request 844. The request may include an ID, such as a group ID, based on the hierarchy information. The ID may include or correspond to the ID of the group data structure 402, the ID of the group data structure 502, the group ID 845, or a combination thereof, as illustrative, non-limiting examples. Electronic device 170 sends the request including the ID to server 110, at 916. Although the request is described as including the ID, in other implementations, the request may not include the ID.

Server 110 receives the request and, at 918, generates a response based on the request. For example, server 110 may identify at least a portion of the collection information based on the ID include in the request. As another example, server 110 may generate third analysis data based on the request. At 920, server 110 sends the response that includes the portion of the collection information, the third analysis data, or a combination thereof, to electronic device 170.

Electronic device 170 receives the response and, at 922, displays or initiates display of a second interface element. The second interface element may include or correspond to one or more interface outputs as described further herein at least with respect to FIGS. 11-23. The second interface element may be based on the hierarchy information, the collection information, the third analysis data, or a combination thereof. In some implementations, electronic device 170 may generate fourth analysis data based on the hierarchy information, the collection information, the third analysis data generated by server 110, or a combination thereof. The first interface element may include one or more selectable options configured to receive an input, such as a user input.

Electronic device 170 may send a download request to server 110, at 924. For example, electronic device 170 may receive an input, such as a user input, and may generate and send the download request based on or in response to the input. As another example, the download request may be an automated request, such as a scheduled request or a periodic request, as illustrative, non-limiting examples.

Server 110 may receive the download request and, at 926, sends download data to electronic device 170. Server 110 may generate or identify the download data based on or in response to the download request. The download data may include the collection information, the first analysis data, the fourth analysis data, or a combination thereof, as illustrative, non-limiting examples. Electronic device 170 may receive the download data and may store or process the received download data.

Electronic device 170 may send update member information to server 110, at 928. The update member information may include or correspond to membership information update 858 or first member information 854. Server 110 may receive the update membership information and, at 930, may update membership information maintained or managed by server 110. The membership information maintained or managed by server 110 may include or correspond to membership information 116. After updating the membership information, server 110 may update the collection information based on the updated membership information.

It is noted that one or more operations described with reference to ladder diagram 900 may be combined or omitted. For example, ladder diagram 900 may not include download request 924. Additionally, although operations are shown and described in a particular order, one or more operations may be performed in a different order or in parallel. Accordingly, ladder diagram 900 is intended to provide an illustrative example and is not intended to be limited to the specific example shown and described. Similarly, while operations are depicted in the drawings in a particular order, this should not be understood as requiring that such operations be performed in the particular order shown or in sequential order, or that all illustrated operations be performed, to achieve desirable results. Can be performed in parallel, may be optional, or may not be performed.

Thus, FIG. 9 demonstrates access of member information associated with multiple organizational hierarchies. For example, the techniques described with reference to FIG. 9 enable electronic device to access member information (e.g., 116) included in collection information (e.g., 118). The techniques also provide efficient management, reporting, and analytics for large data sets, such as the collection information. For example, the hierarchical information (e.g., 117) of an organizational hierarchy may be provided to the electronic device to enable electronic device 170 to easily navigate and request metrics (e.g., key performance indicators), reports, or a combination thereof, for an entirety (or level of an organizational hierarchy) or a sub-set of the member information.

Figure 10:
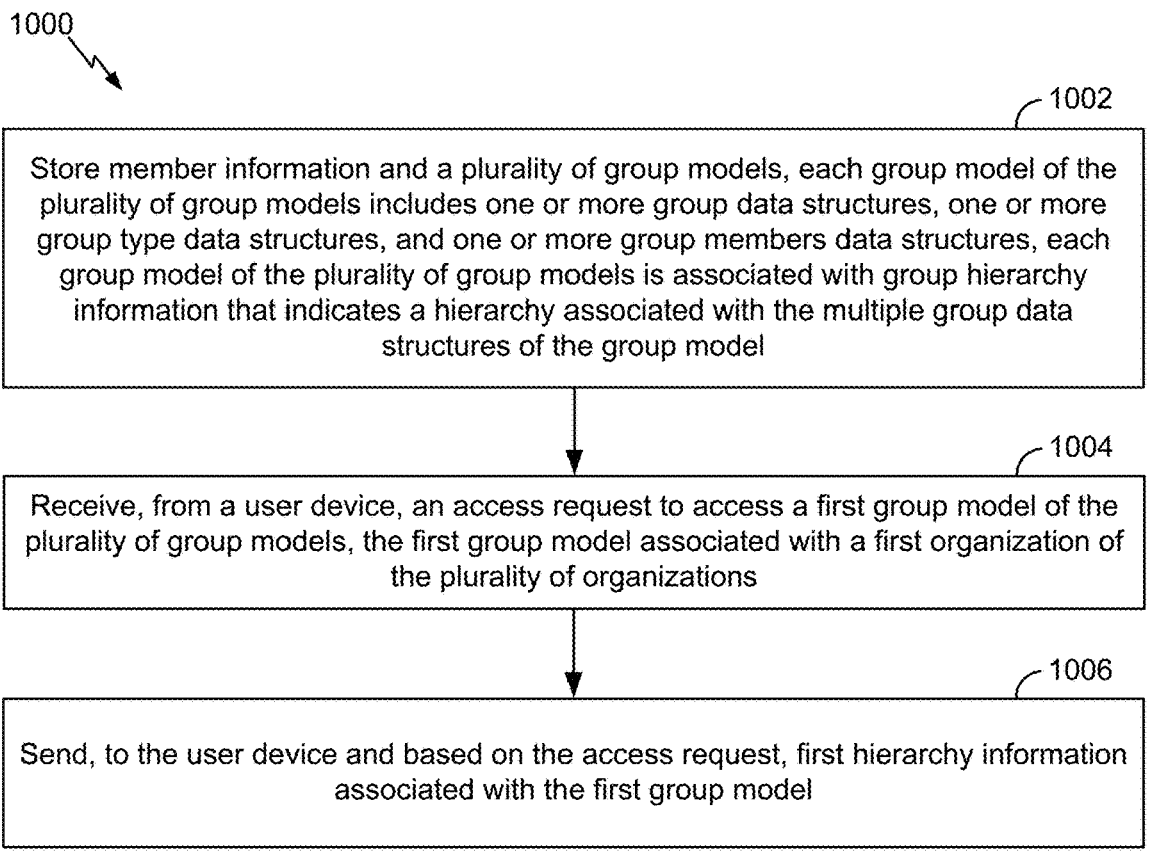
FIG. 10 is a flow diagram illustrating an example process that supports management of member information associated with multiple organization hierarchies according to one or more aspects.

FIG. 10 is a flow diagram illustrating an example process 1000 that supports management of member information associated with multiple organization hierarchies according to one or more aspects. Operations of the process 1000 may be performed by a server, such as the server 110 described above with reference to at least FIGS. 1, 3, 6, 8, and 9. For example, example operations (also referred to as "blocks") of the process 1000 may enable the server 110 to manage member information associated with multiple organization hierarchies.

In block 1002, the server stores member information and a plurality of group models. The member information may include or correspond to member information 116, and the plurality of group models may include or correspond to group models 112. Each group model of the plurality of group models may include one or more group data structures, one or more group type data structures, and one or more group member data structures. For example, a group model may include or correspond to data model pattern 400 of FIG. 4 or data model pattern 500 of FIG. 5, as illustrative, non-limiting example. Each group model of the plurality of group models is associated with group hierarchy information that indicates a hierarchy of the one or more group data structures associated with the group model. The group hierarchy information may include or correspond to group hierarchy information 114.

In some implementations, each group model of the plurality of group models is associated with a different organization of a plurality of organizations. Additionally, or alternatively, at least one group model of the plurality of group models may include multiple group data structures, multiple group type data structures, and multiple group member data structures.

In some implementations, the member information associated with multiple organization hierarchies. The multiple organization hierarchies may include one or more OEM hierarchies, the plurality of organizations may include a plurality of OEMs, or a combination thereof.

In block 1004, the server receives, from a user device, an access request to access a first group model of the plurality of group models. The user device may include or correspond to first entity 150, second entity 152, or electronic device 170. The access request may include or correspond to access request 158 or first access request 840. The first group model may be associated with a first organization of a plurality of organizations.

In block 1006, the server sends, to the user device and based on the access request, first hierarchy information associated with the first group model. For example, the first hierarchy information may include or correspond to the first hierarchy information 117. In some implementations, the first hierarchy information includes an organization hierarchy associated with the multiple group data structures based on the multiple group type data structures. In some implementations, the server may select the first hierarchy information based on the access request.

In some implementations, the first hierarchy information sent to the user device is stored (e.g., cached) at a memory of the user device. The first hierarchy information may be stored (e.g., cached) at the memory of the user device to enable the user device to request, receive, or generate one or more reports associated with one or more members of the first organization.

In some implementations, the server stores the first group model of the plurality of group models and the first group model is associated with the first hierarchy information. Additionally, the server may store a second group model of the plurality of group models and the second group model is associated with second hierarchy information different from the first hierarchy information.

In some implementations, at least one group data structure of the multiple group data structures includes a group ID, a name, a description, a group type ID, a parent group ID, or a combination thereof. A first group data structure of the multiple group data structures may indicate, such as via the parent group ID, a hierarchical relationship between the first group data structure and a second group data structure of the multiple data structures. Additionally, or alternatively, at least one group type data structure of the multiple group type data structures includes a group type ID, a name, and a description, or a combination thereof. The name of the at least one group type data structure may indicate an OEM, a region group, a region, area, market, a dealer, a dealer group, or a vehicle group. In some implementations, at least one group member of the multiple group member data structures includes a group member ID, a group ID, a vehicle ID, or a combination thereof. The at least one group member may further include or indicate information included in member information other than a member ID or vehicle ID. To illustrate, the at least one group member may indicate a unique identifier associated with a member, such as a vehicle or device. The unique identifier may include a VIN, a serial number, or a social security number, as illustrative, non-limiting examples.

In some implementations, the server may further store the member information, such as vehicle information, that includes or indicates at least one member, such as multiple members. Each group member of the multiple group member data structures may include or indicate one or more member of the multiple members. Additionally, or alternatively, each member of the at least one member includes a unique member ID. In some implementations, the member information, for at least one member, includes a vehicle ID, a VIN, a fleet ID, an active status, created by information, record update information, a state ID, license information, a registration ID, registration expiration information, emission expiration, a toll tag number, an availability date, a location ID, or a combination thereof. Additionally, or alternatively, the member information may include or be associated with a vehicle ID, vehicle model information, contract information, fleet information, telematics information, payment information, or a combination thereof. In some implementations, the server stores management information that includes the member information, vehicle model information, contract information, fleet information, telematics information, payment information, or a combination thereof.

In some implementations, the server receives the member information associated with a plurality of members. For a member of the plurality of members, the server may generate and store a member entry. Additionally, the server may receive operation information associated with the member, and may update the member entry based on the operation information.

In some implementations, the server receives receiving a load program associated with a first organization of the plurality of organizations. The server may execute or initiate execution of the load program. Execution of the load program may include receiving or accessing organization information of the first organization, normalizing the organization information to generate normalized organization information, and generating, based on the normalized organization information, a first group model of the plurality of group models. The first group model may be associated with the first organization. In some implementations, generation the first group model may include generating a first set of group data structures and generating a first set of group member data structures. Each group member data structure of the first set of group member data structures may be associated with one or more members of a plurality of members. Additionally, generation of the first group model also may include generating one or more group type data structures. In some implementations, execution of the load program may include generating hierarchy information associated with a hierarchy of the first organization.

In some implementations, the server receives, via an API, a request associated with a first group ID of the first group model of the plurality of group models. The API may include or correspond to the API 362. The request may include request for information based on input received via a user device, such as an input of a selectable option presented via an interface, as described further herein at least with reference to FIGS. 12-23. The server may output, based on the first group ID associated with the request, output data associated with a hierarchical structure of one or more group IDs subordinate to the first group ID, one or more member IDs subordinate to the first group ID, or a combination thereof. In some implementations, the output data includes or is based on collection information, such as first collection information 118. In some implementations, the API includes a REST API.

Figure 11:
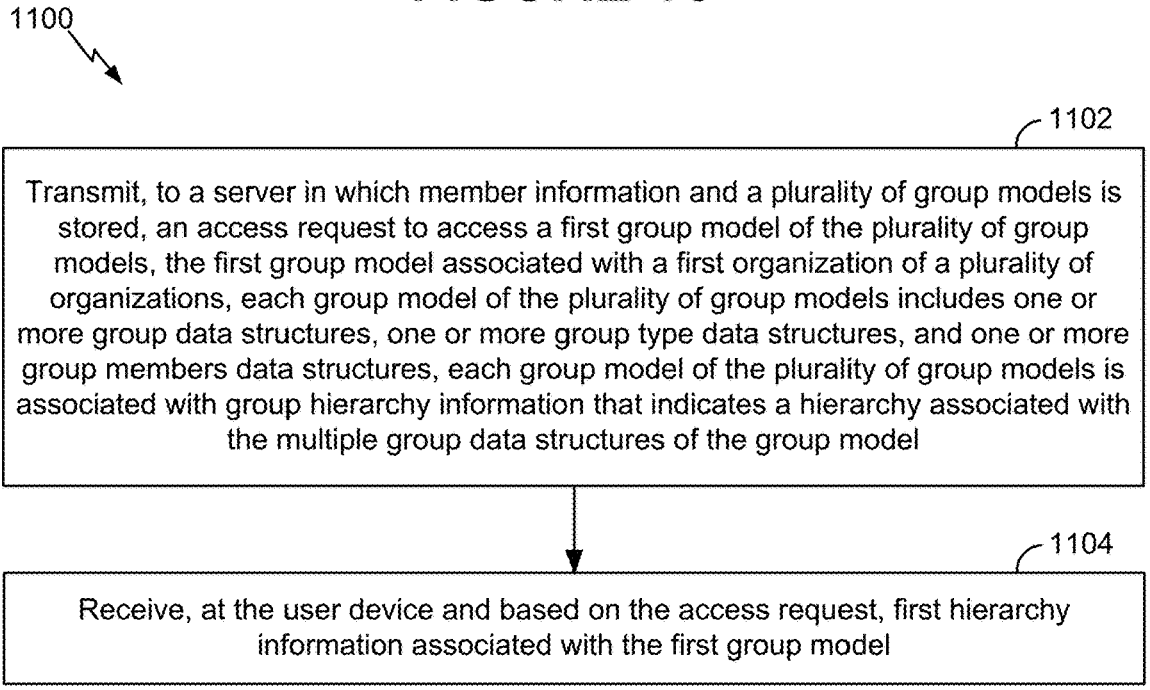
FIG. 11 is a flow diagram illustrating an example process that supports access of member information from a server storing multiple organization hierarchies according to one or more aspects.

FIG. 11 is a flow diagram illustrating an example process 1100 that supports accessing member information from a server storing multiple organization hierarchies according to one or more aspects. Operations of the process 1100 may be performed by a user device (e.g., an electronic device), such as include or correspond to first entity 150, second entity 152, or electronic device 170. For example, For example, example operations (also referred to as "blocks") of the process 1100 may enable the user device to access member information from a server storing multiple organization hierarchies.

In block 1102, the user device transmits, to a server in which member information and a plurality of group models is stored, an access request to access a first group model of the plurality of group models. The first group model is associated with a first organization of a plurality of organizations. The server may include or correspond to server 110. Additionally, the member information and the plurality of group models may include or correspond to member information 116 and group models 112, respectively. The access request may include or correspond to access request 158 or first access request 840.

Each group model of the plurality of group models is associated with a different organization of a plurality of organizations and includes multiple group data structures, multiple group type data structures, and multiple group member data structures. Each group model of the plurality of group models may be associated with group hierarchy information that indicates a hierarchy associated with the multiple group data structures associated with the group model.

In block 1104, the user device receives, based on the access request, first hierarchy information associated with the first group model. For example, the first hierarchy information may include or correspond to the first hierarchy information 117. In some implementations, the first hierarchy information includes an organization hierarchy associated with the multiple group data structures based on the multiple group type data structures.

In some implementations, the user device stores the first hierarchy information at a memory of the user device. The memory may include a cache memory, as an illustrative, non-limiting example. Storage of the first hierarchy information at the memory enables generation of one or more reports associated with one or more members of the first organization. To illustrate, the user device may access the first hierarchical information to identify an identifier, such as a group ID, included in the first hierarchical information, and may include the group ID in a request sent to the server. Responsive to the request, the user device may receive output data and generate a report based on the output data. The output data may include or correspond to at least a portion of first collection information 118.

In some implementations, the member information is associated with multiple organizational hierarchies, such as multiple OEM hierarchies. Additionally, or alternatively, the plurality of organizations include a plurality of OEMs. In some implementations, at least one group model of the plurality of group models is associated with OEM information that includes one or more user IDs, user access information, or a combination thereof.

In some implementations, the user device transmits organization information of the first organization to the server. The server may generate the first group model based on the organization information. Additionally, or alternatively, the user device may transmit member information, such as vehicle information, associated with one or more members to the server. The member information may include a vehicle ID, a VIN, a fleet ID, an active status, created by information, record update information, a state ID, license information, a registration ID, registration expiration information, emission expiration, a toll tag number, an availability date, a location ID, or a combination thereof, as illustrative, non-limiting examples.

In some implementations, the user device transmits, via an API, a request associated with a first group ID of the first group model of the plurality of group models. The API may include or correspond to the API 362. The request may include request for information based on input received via a user device, such as an input of a selectable option presented via an interface, as described further herein at least with reference to FIGS. 12-23. The user device may receive, based on the first group ID associated with the request, output data associated with a hierarchical structure of one or more group IDs subordinate to the first group ID, one or more member IDs subordinate to the first group ID, or a combination thereof. In some implementations, the output data includes or is based on collection information, such as first collection information 118. In some implementations, the API includes a REST API.

In some implementations, the user device receives performance metrics of a set of members of one or more members associated with the first group model. The one or more members may include one or more vehicles, as an illustrative, non-limiting example. In a particular implementation, the set of members includes all members of the one or more members. Additionally, or alternatively, the set of members is a subset of the one or more members that is restricted or filtered based on access rights associated with the user device or of a user of the user device. The performance metrics may include or correspond to at least a portion of the first collection information 118, at least a portion of the management information 330, or a combination thereof. For example, the performance metrics are associated with vehicle model information, agreement information (e.g., contract information or contract terms), fleet information, telematics information, payment information, or a combination thereof. The user device may initiating output of a display based on the performance metrics, the first hierarchy information, or a combination thereof.

In some implementations, the user device receives a first selection of a first group type of the multiple group type data structures. The first group type may be is associated with an OEM, a region group, a region, area, market, a dealer, a dealer group, or a vehicle group, as illustrative, non-limiting examples. In response to the first selection, the user device may initiate display of a first aggregation of the performance metrics based on the first hierarchy information. Additionally, or alternatively, the user device may receive a second selection of a second group type of the multiple group type data structures. In response to the second selection, the user device may initiate display of a second aggregation of the performance metrics based on the first hierarchy information. The first aggregation may be different from or the same as the second aggregation.

It is noted that one or more blocks (or operations) described with reference to FIGS. 6, 10, and 11 may be combined with one or more blocks (or operations) described with reference to another of the figures. For example, one or more blocks (or operations) of FIG. 10 may be combined with one or more blocks (or operations) of FIG. 11. As another example, one or more blocks associated with FIG. 6 may be combined with one or more blocks (or operations) associated with FIG. 10 or 11. As another example, one or more blocks associated with FIG. 10 or 11 may be combined with one or more blocks (or operations) associated with FIG. 9. As another example, one or more blocks associated with FIG. 6, 10, or 11 may be combined with one or more blocks (or operations) associated with FIG. 1, 3, or 8.

Referring to FIGS. 12-23, one or more views provided by system 100, 300, 800 or ladder diagram 900 are shown. To illustrate, the one or more views may be initiated at or by server 110, first entity 150, second entity 152, or electron device 170. For example, each of FIGS. 12-14 include examples of an interface associated with a dashboard. Each of FIGS. 15-23 include examples of an interface associated with a utilization report. It is noted that information displayed via one or more of the interfaces of FIGS. 12-23 may be adapt to display only data that a user has been given access to—e.g., data or access may be restricted based on user rights information 326.

One or more of the interfaces of FIGS. 12-23 may include or correspond to a graphical user interface (GUI) generated by server 110 (e.g., on or more processors 350, manager 352, and/or user interface generator 356), first entity 150 (e.g. one or more processors 812), second entity 152, and/or electronic device 170 (e.g., one or more processors 172, display adapter 180, or user interface adapter 182) and presented by a display device, such as a display device associated with server 110, first entity 150, second entity 152, or electronic device 170 (e.g., display device 192). Additionally, or alternatively, interactions (e.g., input selections) with the interfaces may be initiated by first entity 150, second entity 152, or electronic device 170 and communicated to server 110 (e.g., on or more processors 350, manager 352, user interface generator 356, and/or API 362), and operations/functions to present and/or modify the interfaces may be performed by server 110 server 110 (e.g., on or more processors 350, manager 352, user interface generator 356, and/or API 362), first entity 150 (e.g. one or more processors 812), second entity 152, and/or electronic device 170 (e.g., one or more processors 172, display adapter 180, or user interface adapter 182).

Figure 12:
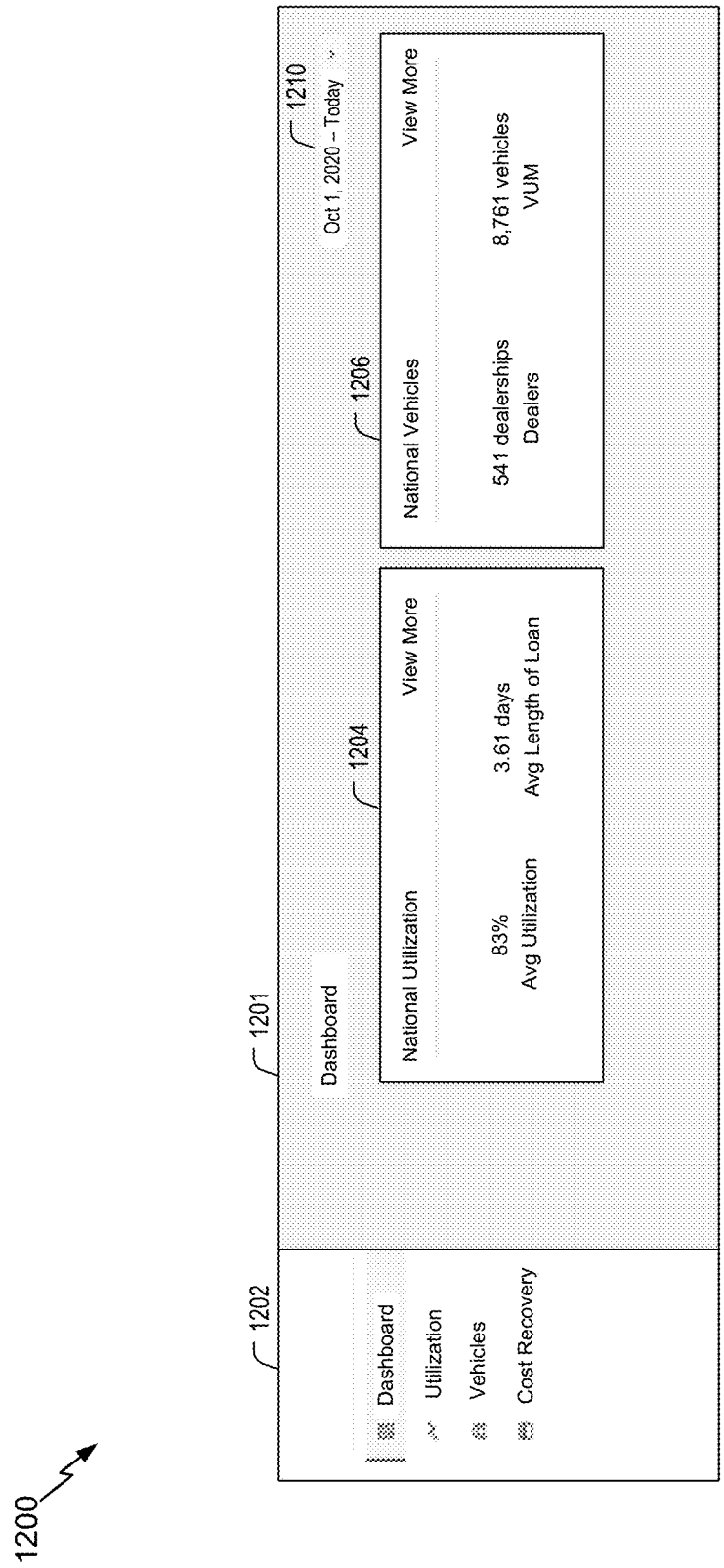
FIG. 12 is an example of an interface associated with a dashboard according to one or more aspects.

Referring to FIG. 12, an example of an interface associated with a dashboard is shown and designated 1200. Interface 1200 includes a dashboard panel 1201 and a navigation panel 1202. Navigation panel 1202 includes selectable options to navigate to an interfaces, such as a dashboard option (i.e., the current interface), a utilization interface, a vehicle interface, and a cost recovery interface. Dashboard panel 1201 includes a card layout having a first card 1204 and a second card 1206. Each card is associated with a performance metric. For example, first card 1204 is associated with a utilization metric, such as a percentage of vehicles that are utilized in a loan capacity and an average length of the loans. Second card 1206 is associated with vehicle information and indicates a number of dealerships and a number of vehicles at the dealerships for an organization. Interface 1200 also includes a selectable date range filter 1210 to request the performance metrics be filtered based on a date or date range. In some implementations, selectable date range filter 1210 is configured to be adjusted to view various timeframes, such as month to date or year to date.

Figure 13:
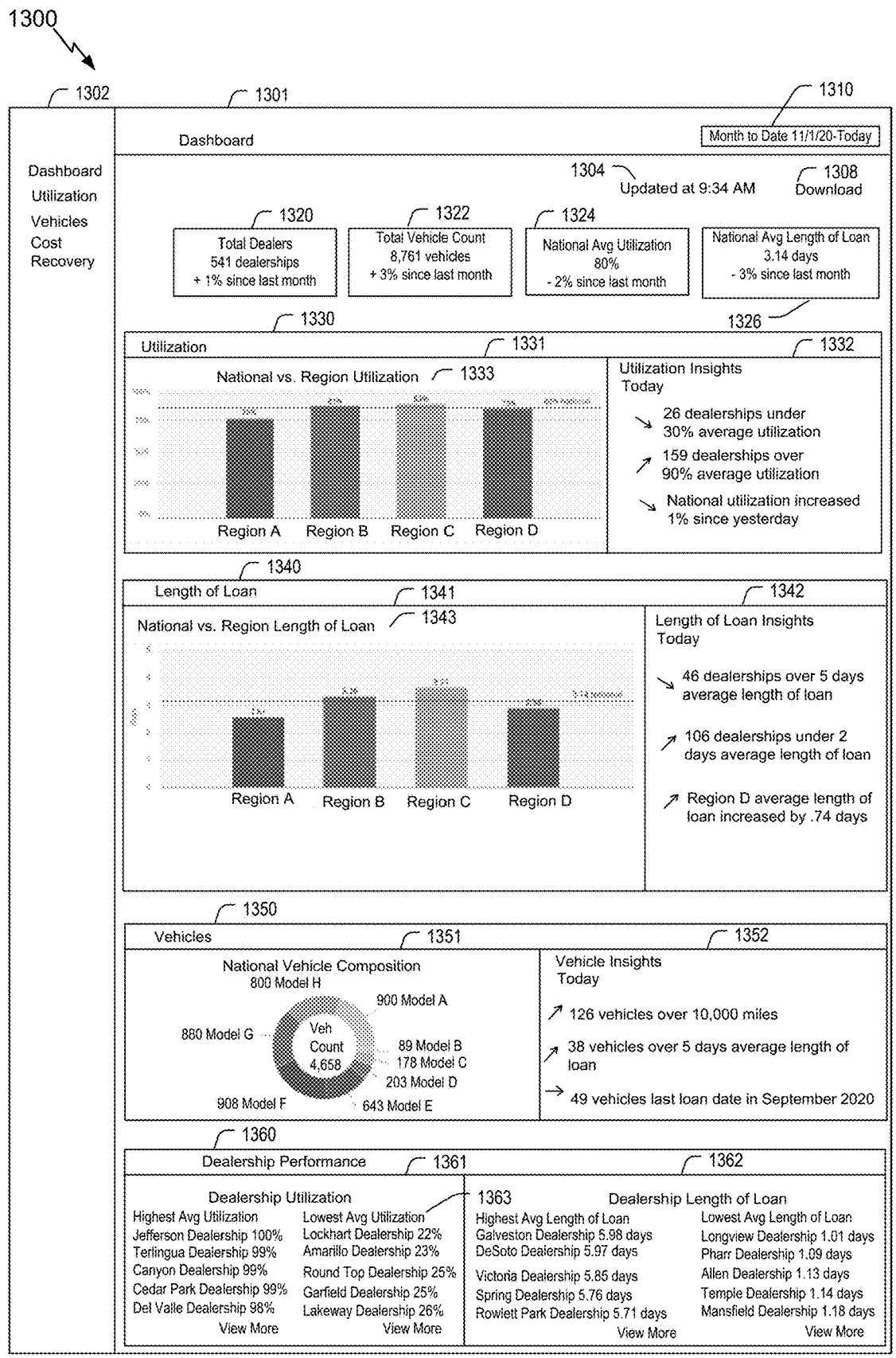
FIG. 13 is an example of an interface associated with a dashboard according to one or more aspects.

Referring to FIG. 13, an example of an interface associated with a dashboard is shown and designated 1300. Interface 1300 includes a dashboard panel 1301 and a navigation panel 1302. Dashboard panel 1301 may include or correspond to dashboard panel 1201, and navigation panel 1302 may include or correspond to navigation panel 1202.

Dashboard panel 1301 includes a card layout having one or more cards. As shown, the one or more cards include a first card 1320, a second card 1322, a third card 1324, a fourth card 1326, a fifth card 1330, a sixth card 1340, a seventh card 1350, and an eighth card 1360. Each card of the one or more cards is associated with a performance metric. First card 1320 indicates a total number of dealerships included in an organizational hierarchy, second card 1322 indicates a total number of vehicles associate with the organizational hierarchy (e.g., a number of vehicles under management), third card 1324 indicates an average utilization of the vehicles, and fourth card 1326 indicates an average length of a loan per vehicle. In some implementations, each of first card 1320, second card 1322, third card 1324, and fourth card 1326 indicates a percentage of change for a time period of a performance metric as compared to a previous time period of the performance metric.

Additionally, fifth card 1330 is associated with utilization metrics, sixth card 1340 is associated with length of loan metrics, seventh card 1350 is associated with vehicle metrics, and eighth card 1360 is associated with dealership metrics. Fifth card 1330 includes a first portion 1331 that indicates utilization of different regions as compared to a national utilization and a second portion 1332 that indicates utilization insights. It is noted that first portion 1331 includes a selectable arrow 1333 to enable selection of different a different format of the graph or different information, such as a utilization of sub-regions of a particular region (e.g., region B). Sixth card 1340 includes a first portion 1341 that indicates lengths of loans of different regions as compared to a national length of loan and a second portion 1342 that indicates length of loan insights. It is noted that first portion 1341 includes a selectable arrow 1343 to enable selection of different a different format of the graph or different information, such as a length of loans of sub-regions of a particular region (e.g., region B). Additionally, selection of a region in either of first portion 1331 or first portion 1341 may request a utilization report for the selected region.

Seventh card 1350 includes a first portion 1351 and a second portion 1352. First portion 1351 indicates a national vehicle composition based on different models of vehicles and second portion 1352 indicates vehicle insights. Eighth card 1360 includes a first portion 1361 and a second portion 1362. First portion 1361 indicates dealership utilization information and second portion 1362 indicates dealership length of loan information. Each dealership indicated in first portion 1361 and second portion 1362 includes a selectable arrow, such as representative arrow 1363, to request additional dealership performance information for a specific dealership.

Dashboard panel 1301 also includes an indicator 1304 of when dashboard data was last uploaded and a selectable download indicator 1308 to request download of the dashboard data. Additionally, as shown, dashboard panel 1301 includes a selectable date range filter 1310 to request that the dashboard data be filtered based on a date or date range. Selectable date range filter 1310 may include or correspond to selectable date range filter 1210.

Figure 14:
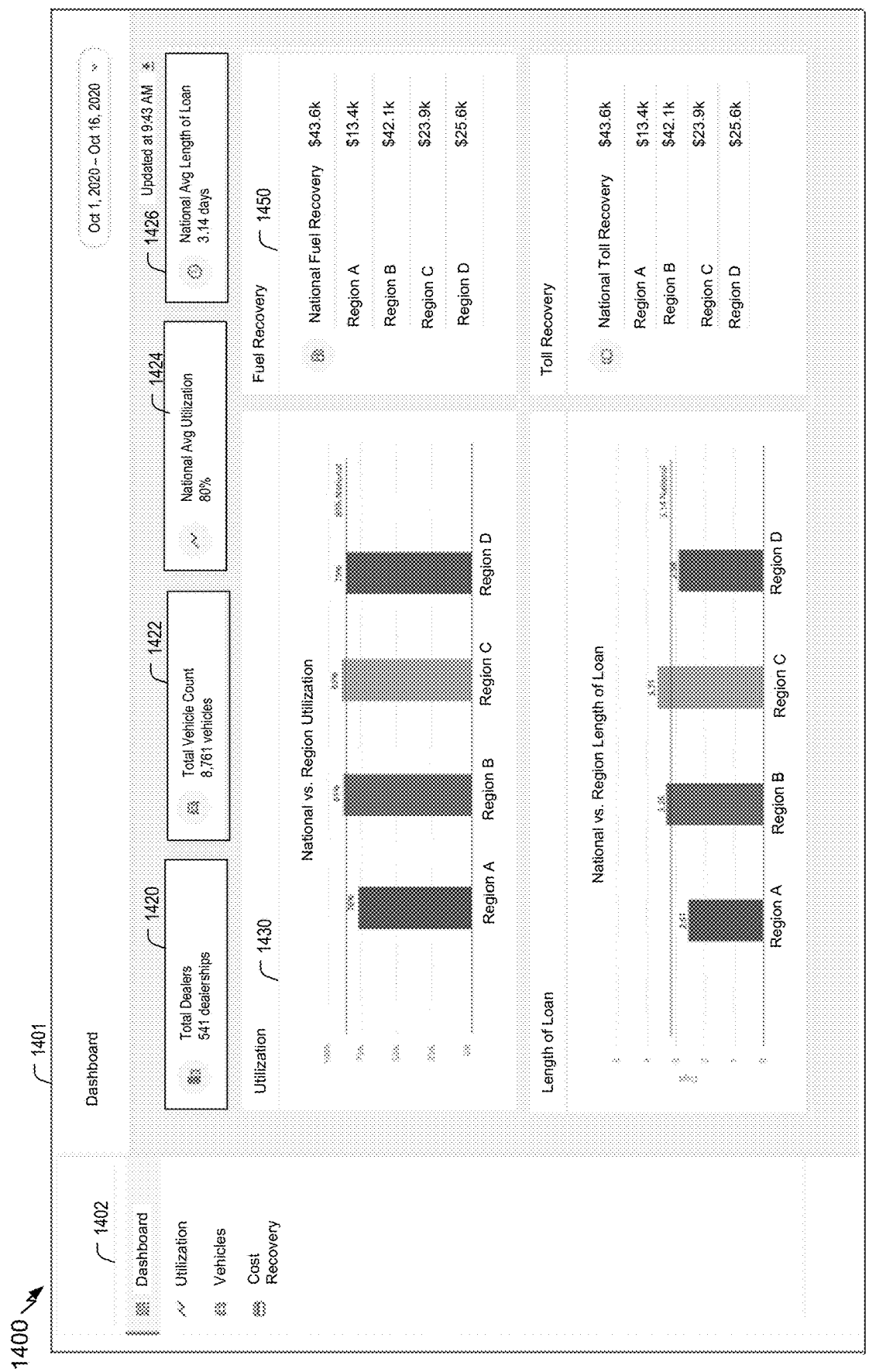
FIG. 14 is an example of an interface associated with a dashboard according to one or more aspects.

Referring to FIG. 14, an example of an interface associated with a dashboard is shown and designated 1400. Interface 1400 includes a dashboard panel 1401 and a navigation panel 1402. Dashboard panel 1401 may include or correspond to dashboard panel 1201 or 1301, and navigation panel 1402 may include or correspond to navigation panel 1202 or 1302.

Dashboard panel 1401 includes a card layout having one or more cards. As shown, the one or more cards include a first card 1420, a second card 1422, a third card 1424, a fourth card 1426, a fifth card 1430, a sixth card 1440, a seventh card 1450, and an eighth card 1460. Each card of the one or more cards is associated with a performance metric. First card 1420 indicates a total number of dealerships included in an organizational hierarchy, second card 1422 indicates a total number of vehicles associate with the organizational hierarchy (e.g., a number of vehicles under management), third card 1424 indicates an average utilization of the vehicles, and fourth card 1426 indicates an average length of a loan per vehicle.

Additionally, fifth card 1430 is associated with utilization metrics, sixth card 1440 is associated with length of loan metrics, seventh card 1450 is associated with fuel recovery metrics, and eighth card 1460 is associated with toll recovery metrics. Fifth card 1430 indicates utilization of different regions as compared to a national utilization. Fifth card 1430 may include or correspond to fifth card 1330. Sixth card 1440 indicates lengths of loans of different regions as compared to a national length of loan. Sixth card 1440 may include or correspond to sixth card 1340.

Seventh card 1350 includes a first portion 1351 and a second portion 1352. First portion 1351 indicates a national vehicle composition based on different models of vehicles and second portion 1352 indicates vehicle insights. Eighth card 1360 includes a first portion 1361 and a second portion 1362. First portion 1361 indicates dealership utilization information and second portion 1362 indicates dealership length of loan information. Each dealership indicated in first portion 1361 and second portion 1362 includes a selectable arrow, such as representative arrow 1363, to request additional dealership performance information for a specific dealership.

Figure 15:
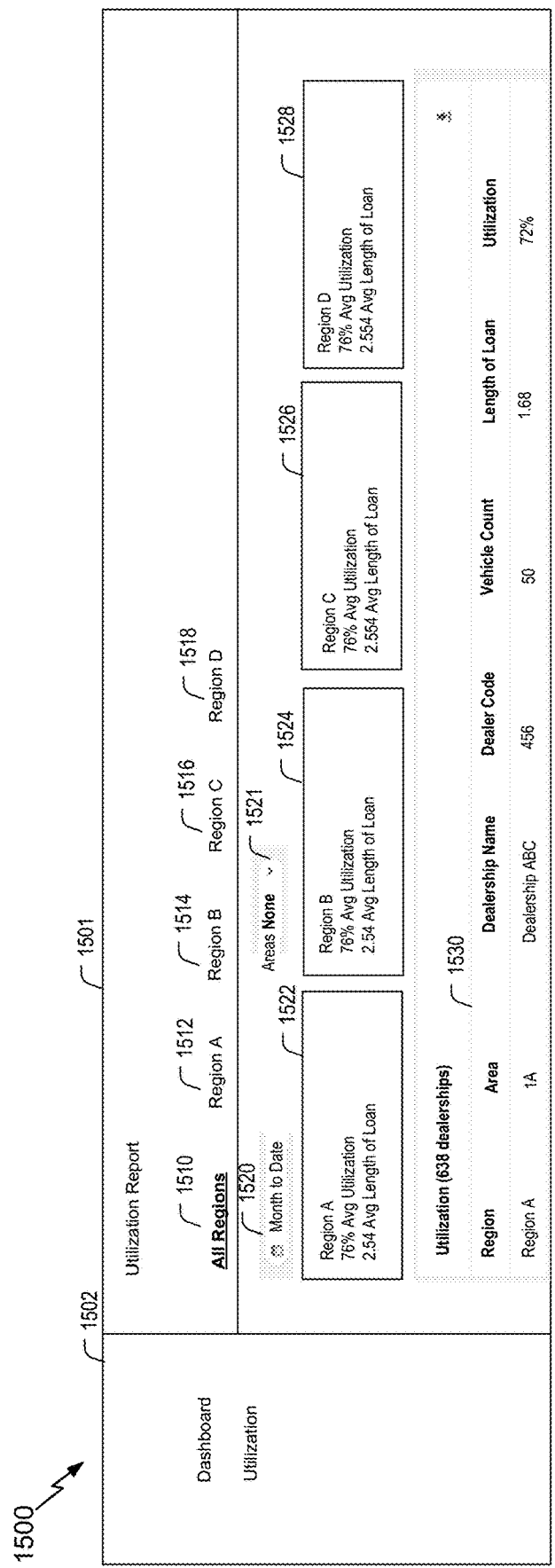
FIG. 15 is an example of an interface associated with a utilization report according to one or more aspects.

Referring to FIG. 15, an example of an interface associated with a utilization report is shown and designated 1500. Interface 1500 includes a utilization report panel 1501 and a navigation panel 1502. Navigation panel 1502 may include or correspond to navigation panel 1202, 1302, or 1402.

Utilization report panel 1501 enables navigation through an organizational hierarchy, such as an organizational hierarchy that includes one or more regions, each region composed of one or more areas, each area composed of one or more dealerships, and each dealership including one or more vehicles. For example, utilization report panel 1501 includes one or more selectable navigation tags, such as a first tag 1510 for all regions, a second tag 1512 for region A, a third tag 1514 for region B, a fourth tag 1516 for region C, and a fifth tag 1518 for region D. Utilization report panel 1501 also includes a selectable date range filter 1520 to request that the utilization report data be filtered based on a date or date range. Selectable date range filter 15200 may include or correspond to selectable date range filter 1210 or 1310. Utilization report panel 1501 also includes an area selection option 1521 (e.g., a dropdown option) that may be used to select a specific area of a region selected via one of tags 1510, 1512, 1514, or 1516.

Utilization report panel 1501 includes a card layout having one or more cards. As shown, the one or more cards include a first card 1522, a second card 1524, a third card 1526, a fourth card 1528, and a fifth card 1530. First card 1522 indicates, for region A, an average utilization and an average length of loan; second card 1524 indicates, for region B, an average utilization and an average length of loan; third card 1526 indicates, for region C, an average utilization and an average length of loan; and fourth card 1528 indicates, for region D, an average utilization and an average length of loan. Fifth card 1530 includes a listing of one or more dealerships included in selected first tag 1510 (e.g., all regions) and corresponding information and metrics.

Figure 16:
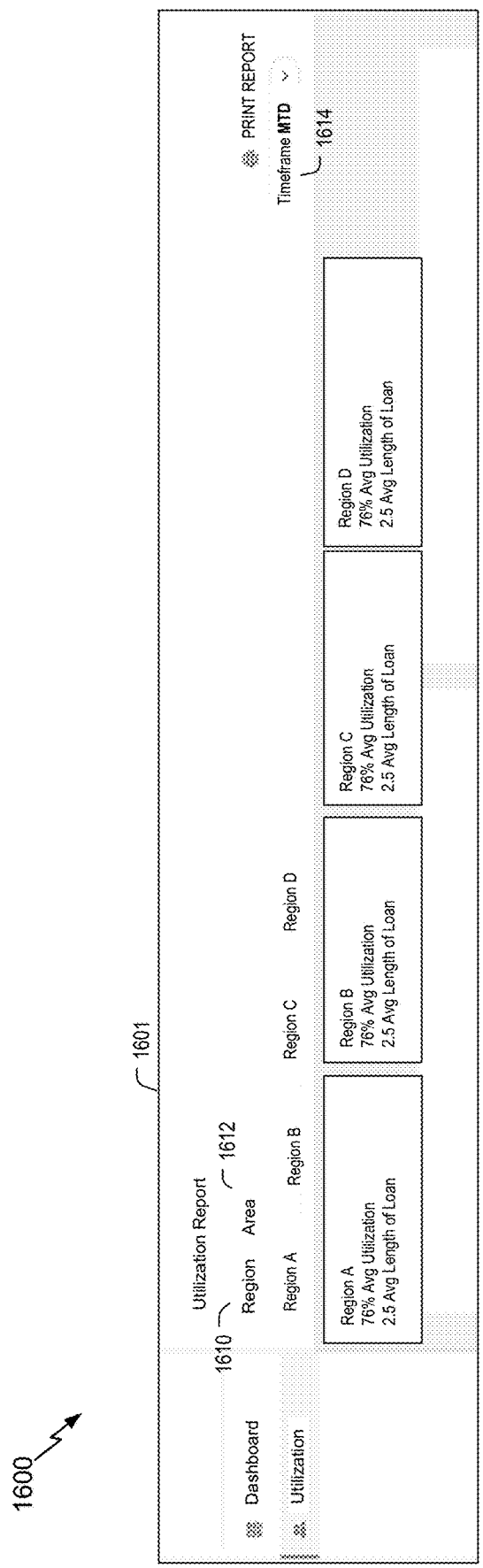
FIG. 16 illustrates an example of an interface associated with a utilization report according to one or more aspects.

Referring to FIG. 16, an example of an interface associated with a utilization report is shown and designated 1600. Interface 1600 includes a utilization report panel 1601. Utilization report panel 1601 may include or correspond to utilization report panel 1501. As compared to utilization report panel 1501, utilization report panel 1601 includes one or more selectable buttons, such as a representative first button 1610 and a represented second button 1612. The one or more selectable buttons of utilization report panel 1601 are provided instead of the one or more selectable navigation tags of utilization report panel 1501 and provide the same or similar navigation options as the one or more selectable navigation tags of utilization report panel 1501. Additionally, as shown, utilization report panel 1601 includes a selectable date range filter 1614 to request that the utilization report be filtered based on a date or date range. Selectable date range filter 1614 may include or correspond to selectable date range filter 1210 or 1310.

Referring to FIG. 17, an example of an interface associated with a utilization report is shown and designated 1700. Interface 1700 includes a utilization report panel 1701. Utilization report panel 1701 may include or correspond to utilization report panel 1501 or 1601. As compared to utilization report panels 1501 and 1601, utilization report panel 1701 includes a navigation section 1710 to enable navigation from all regions, to a specific region, to a specific area. As shown region B is selected and area 204 is selected. It is noted that different regions or different areas may be selected in a dropdown manner using dropdown arrows included in navigation section 1710. Utilization report panel 1701 includes a card layout having one or more cards, such as a first card 1714. First card 1714 includes a listing of one or more dealerships based on navigation section 1710 and corresponding information and metrics. Additionally, first card 1714 includes a search option 1716, such as a keyword search, and a download option 1718.

Figure 18:
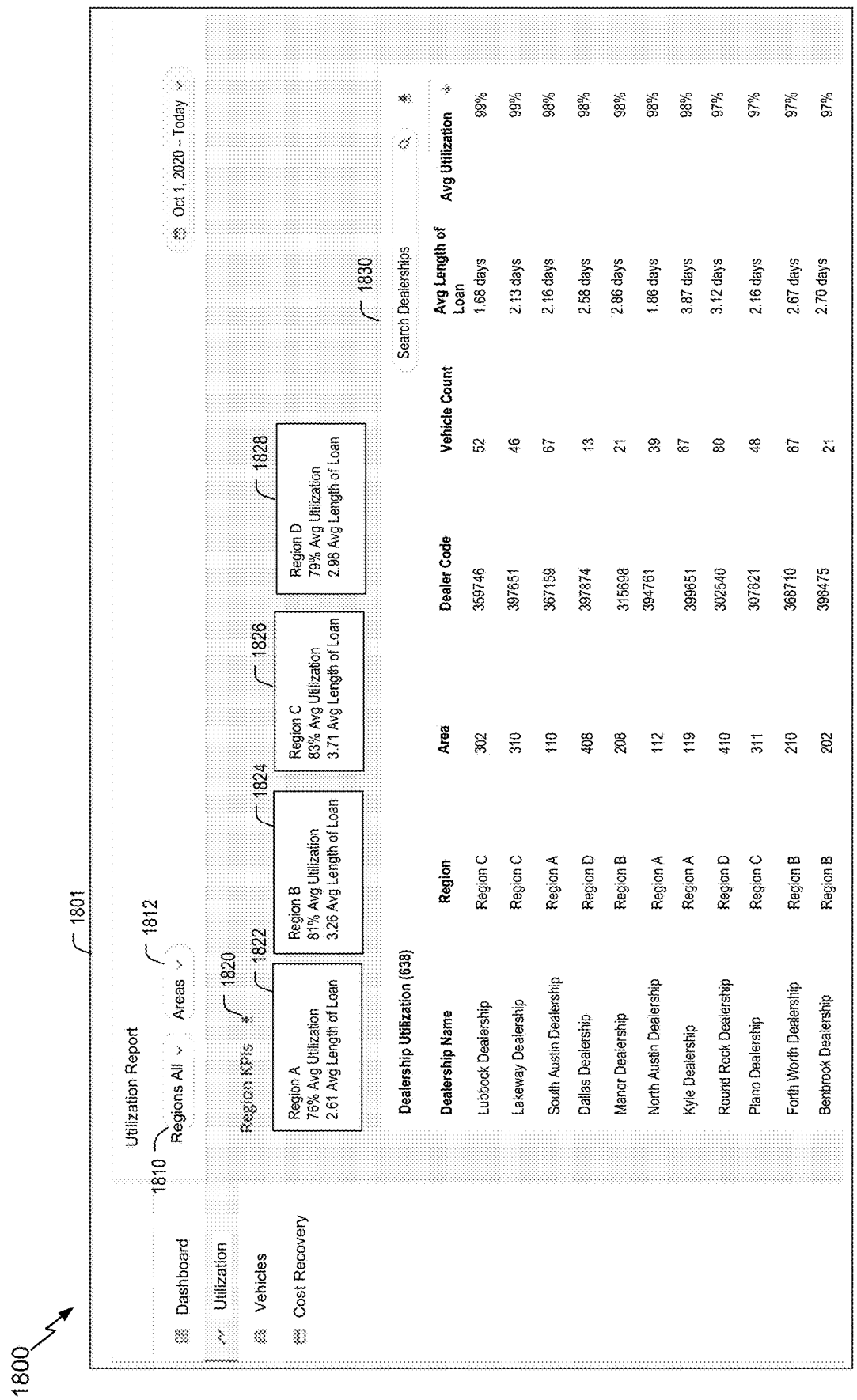
FIG. 18 illustrates an example of an interface associated with a utilization report according to one or more aspects.

Referring to FIG. 18, an example of an interface associated with a utilization report is shown and designated 1800. Interface 1800 includes a utilization report panel 1801. Utilization report panel 1801 may include or correspond to utilization report panel 1501, 1601, or 1701. As compared to utilization report panels 1501, 1601, and 1701, utilization report panel 1801 includes one or more dropdown navigation buttons, such as a first button 1810 associated with one or more regions and a second button 1812 associated with one or more area. Utilization report panel 1801 also includes information of regional key performance indicators (KPIs) and includes a download option 1820 to download the regional KPI information. Utilization report panel 1801 includes a card layout having one or more cards. As shown, the one or more cards include a first card 1822, a second card 1824, a third card 18246 a fourth card 1828, and a fifth card 1830. First card 1822 indicates, for region A, an average utilization and an average length of loan; second card 1824 indicates, for region B, an average utilization and an average length of loan; third card 1826 indicates, for region C, an average utilization and an average length of loan; and fourth card 1828 indicates, for region D, an average utilization and an average length of loan. Fifth card 1830 includes a listing of one or more dealerships included in all regions and corresponding information and metrics.

Figure 19:
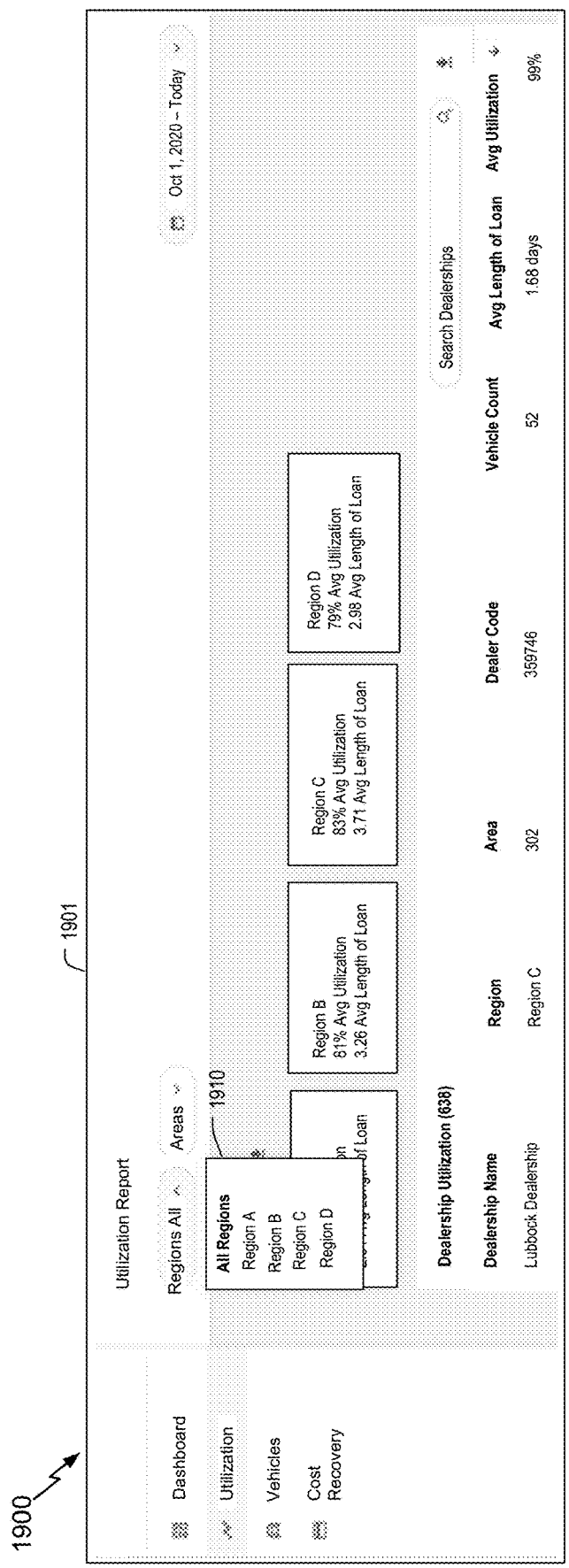
FIG. 19 illustrates an example of an interface associated with a utilization report according to one or more aspects.

Referring to FIG. 19, an example of an interface associated with a utilization report is shown and designated 1900. Interface 1900 includes a utilization report panel 1901. Utilization report panel 1901 corresponds to utilization report panel 1801 and depicts dropdown options 1910 responsive to selection of first button 1810 of utilization report panel 1801.

Figure 20:
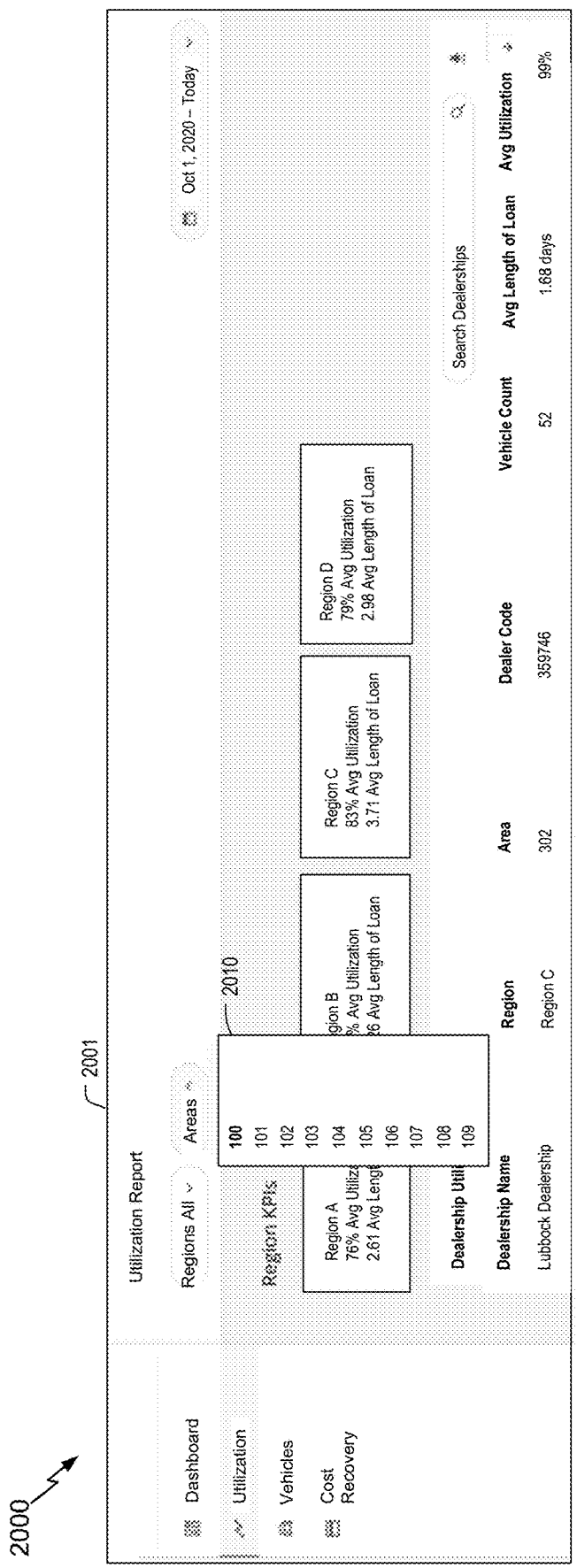
FIG. 20 illustrates an example of an interface associated with a utilization report according to one or more aspects.

Referring to FIG. 20, an example of an interface associated with a utilization report is shown and designated 2000. Interface 2000 includes a utilization report panel 2001. Utilization report panel 2001 corresponds to utilization report panel 1801 and depicts dropdown options 2010 responsive to selection of second button 1812 of utilization report panel 1801.

Figure 21:
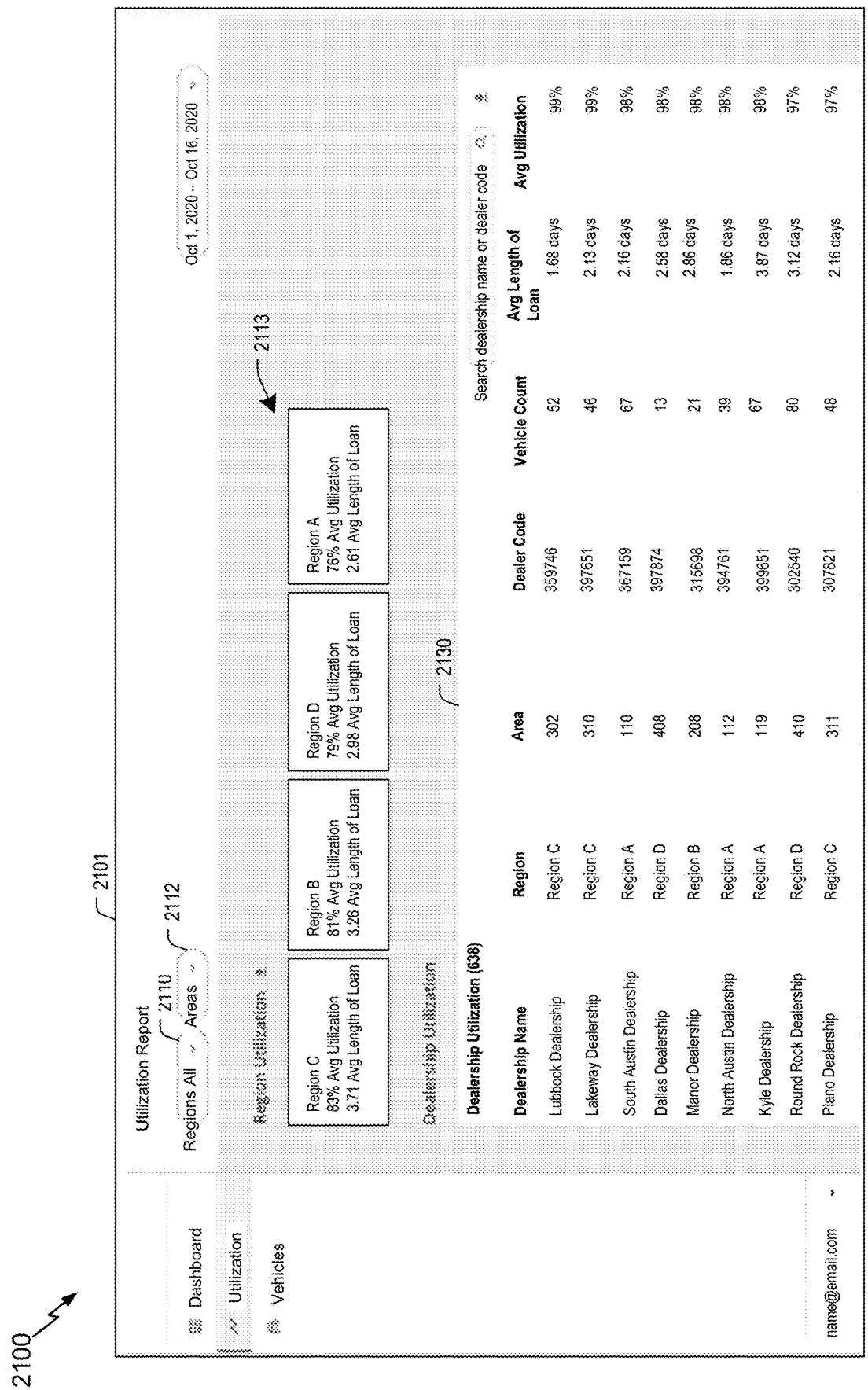
FIG. 21 illustrates an example of an interface associated with a utilization report according to one or more aspects.

Referring to FIG. 21, an example of an interface associated with a utilization report is shown and designated 2100. Interface 2100 includes a utilization report panel 2101. Utilization report panel 2101 may include or correspond to utilization report panel 1501, 1601, 1701, or 1801. Utilization report panel 2101 includes one or more dropdown navigation buttons, such as a first button 2110 associated with one or more regions and a second button 2112 associated with one or more area. First button 2110 and second button 2112 may include or correspond to first button 1810 and second button 1812, respectively. Utilization report panel 2101 also includes information of regional utilization and includes a download option to download the regional utilization information. Utilization report panel 2101 includes a card layout having one or more cards. As shown, a first set of one or more cards 2113 indicates regional information such as, for each region, an average utilization and an average length of loan. Utilization report panel 1801 also includes a card 2130 includes a listing of one or more dealerships included in all regions (based on first button 2110 and second button 2112) and corresponding information and metrics.

Figure 22:
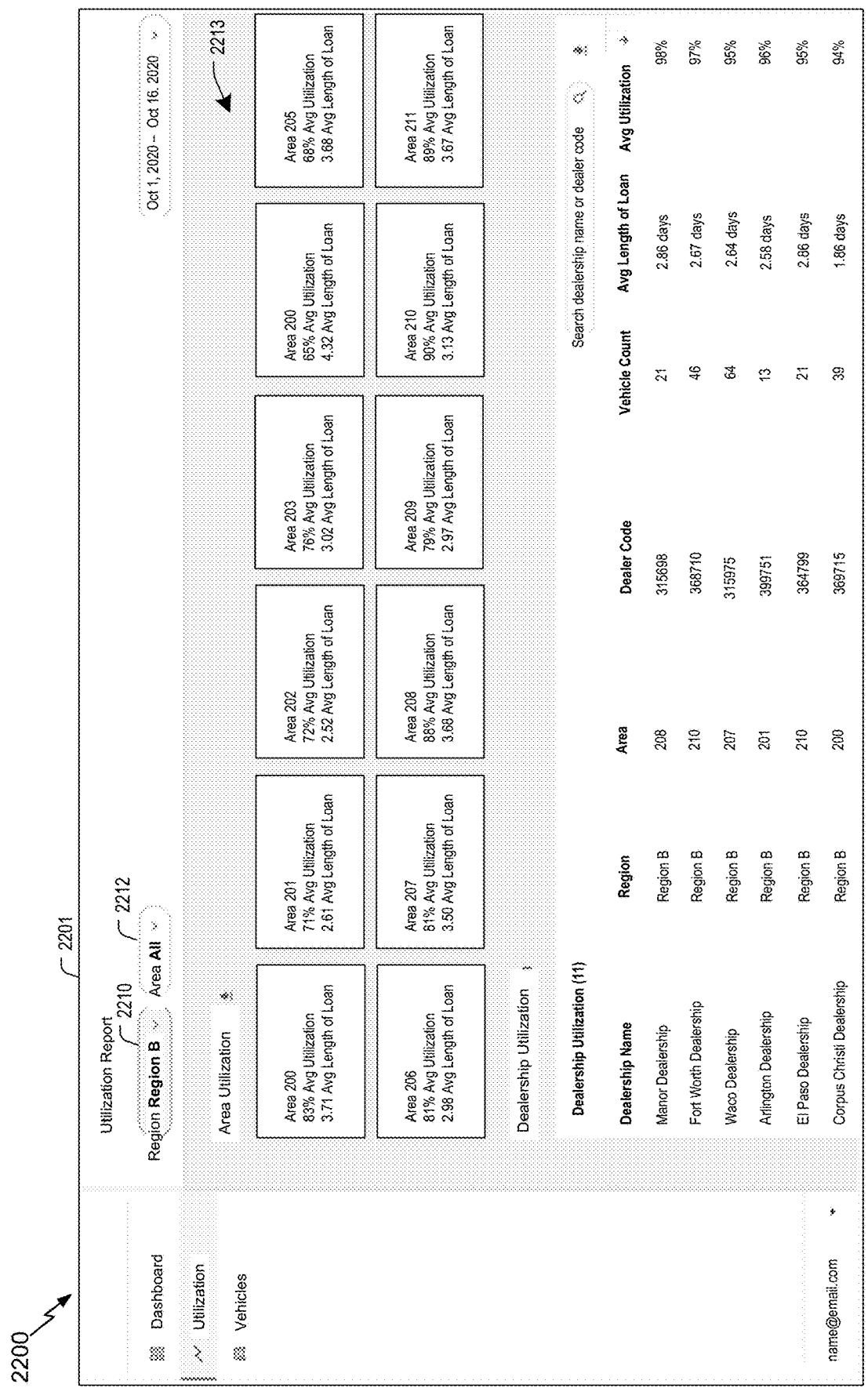
FIG. 22 illustrates an example of an interface associated with a utilization report according to one or more aspects.

Referring to FIG. 22, an example of an interface associated with a utilization report is shown and designated 2200. Interface 2200 includes a utilization report panel 2201. Utilization report panel 2201 corresponds to utilization report panel 2101. Utilization report panel 2201 includes one or more dropdown navigation buttons, such as a first button 2210 associated with one or more regions and a second button 2212 associated with one or more area. First button 2210 and second button 2212 may include or correspond to first button 2110 and second button 2112, respectively. As shown, first button 2210 has been selected for region B. Accordingly, utilization report panel 2201 includes a first set of one or more cards 2213 that indicates area information for one or more areas included in region B. The area information indicates, for each area, an average utilization and an average length of loan. Utilization report panel 2101 also includes a card 2230 includes a listing of one or more dealerships included in areas include in region B (based on first button 2210 and second button 2212) and corresponding information and metrics.

Figure 23:
FIG. 23 illustrates an example of an interface associated with a utilization report according to one or more aspects.

Referring to FIG. 23, an example of an interface associated with a utilization report is shown and designated 2300. Interface 2300 includes a utilization report panel 2301. Utilization report panel 2301 corresponds to utilization report panel 2101 and utilization report panel 2201. Utilization report panel 2301 includes one or more dropdown navigation buttons, such as a first button 2310 associated with one or more regions and a second button 2312 associated with one or more area. First button 2310 and second button 2312 may include or correspond to first button 2110 and 2210 and second button 2112 and 2212, respectively. As shown, first button 2310 has been selected for region B and second button has been selected for area 204. Accordingly, utilization report panel 2301 a card 2330 includes a listing of one or more dealerships included in area 204 of region B (based on first button 2310 and second button 2312) and corresponding information and metrics.

In some aspects, techniques for managing member information associated with multiple organization hierarchies may include additional aspects, such as any single aspect or any combination of aspects described below or in connection with one or more other processes or devices described elsewhere herein. In a first aspect, techniques for managing member information associated with multiple organization hierarchies may include storing, at a server, member information and a plurality of group models. Each group model of the plurality of group models is associated with a different organization of a plurality of organizations and includes multiple group data structures, multiple group type data structures, and multiple group member data structures. Each group model of the plurality of group models is associated with group hierarchy information that indicates a hierarchy associated with the multiple group data structures associated with the group model. The techniques further include receiving, from a user device, an access request to access a first group model of the plurality of group models. The first group model is associated with a first organization of the plurality of organizations. The techniques further include sending, to the user device and based on the access request, first hierarchy information associated with the first group model. In some examples, the techniques in the first aspect may be implemented in a method or process. In some other examples, the techniques of the first aspect may be implemented in an electronic device, such as a server or a component of a server, as illustrative, non-limiting examples. In some examples, the electronic device may include at least one processing unit or system (which may include an application processor, a modem or other components) and at least one memory device coupled to the processing unit. The processing unit may be configured to perform operations described herein with respect to the electronic device. In some examples, the memory device includes a non-transitory computer-readable medium having program code stored thereon that, when executed by the processing unit, is configured to cause the electronic device to perform the operations described herein.

In a second aspect, in combination with the first aspect, the first hierarchy information sent to the user device is cached at a memory of the user device.

In a third aspect, in combination with the second aspect, the first hierarchy information cached at the memory of the user device enables the user device to generate one or more reports associated with one or more members of the first organization.

In a fourth aspect, in combination with one or more of the first aspect through the third aspect, the techniques further include selecting, based on the access request, the first hierarchy information.

In a fifth aspect, in combination with one or more of the first aspect through the fourth aspect, the multiple organization hierarchies include multiple OEM hierarchies, and the plurality of organizations include a plurality of OEMs.

In a sixth aspect, in combination with one or more of the first aspect through the fifth aspect, at least one group model of the plurality of group models is associated with OEM information, and the OEM information includes one or more user IDs, user access information, or a combination thereof.

In a seventh aspect, in combination with one or more of the first aspect through the sixth aspect, at least one group data structure of the multiple group data structures includes a group ID, a name, a description, a group type ID, a parent group ID, or a combination thereof.

In an eighth aspect, in combination with one or more of the first aspect through the seventh aspect, at least one group type data structure of the multiple group type data structures includes a group type ID, a name, and a description, or a combination thereof.

In a ninth aspect, in combination with the eighth aspect, the name of the at least one group type data structure indicates an OEM, a region group, a region, area, market, a dealer, a dealer group, a vehicle group, or a combination thereof.

In a tenth aspect, in combination with one or more of the first aspect through the ninth aspect, at least one group member of the multiple group member data structures includes a group member ID, a group ID, a vehicle ID, or a combination thereof.

In an eleventh aspect, in combination with the tenth aspect, the at least one group member further includes a VIN.

In a twelfth aspect, in combination with one or more of the first aspect through the eleventh aspect, the first hierarchy information includes an organization hierarchy associated with the multiple group data structures based on the multiple group type data structures.

In a thirteenth aspect, in combination with one or more of the first aspect through the twelfth aspect, the first hierarchy information includes group hierarchy information.

In a fourteenth aspect, in combination with one or more of the first aspect through the thirteenth aspect, the techniques further include storing, at the server, member information including multiple members, each group member of the multiple group member data structures including at least one member of the multiple members.

In a fifteenth aspect, in combination with the fourteenth aspect, each member of the multiple members includes a unique member ID.

In a sixteenth aspect, in combination with the fourteenth aspect, where the member information includes vehicle information.

In a seventeenth aspect, in combination with the sixteenth aspect, the vehicle information includes a vehicle ID, a VIN, a fleet ID, an active status, created by information, record update information, a state ID, license information, a registration ID, registration expiration information, emission expiration, a toll tag number, an availability date, a location ID, or a combination thereof.

In an eighteenth aspect, in combination with the sixteenth aspect, the vehicle information includes a vehicle ID, vehicle model information, contract information, fleet information, telematics information, payment information, or a combination thereof.

In a nineteenth aspect, in combination with one or more of the first aspect through the eighteenth aspect, the techniques further include storing a first group model of the plurality of group models, the first group model associated with the first hierarchy information.

In a twentieth aspect, in combination with one or more of the first aspect through the nineteenth aspect, the techniques further include storing a second group model of the plurality of group models, the second group model associated with second hierarchy information different from the first hierarchy information.

In a twenty-first aspect, in combination with one or more of the first aspect through the twentieth aspect, where a first group data structure of the multiple group data structures indicates a hierarchical relationship between the first group data structure and a second group data structure.

In a twenty-second aspect, in combination with one or more of the first aspect through the twenty-first aspect, the techniques further include receiving member information associated with a plurality of members.

In a twenty-third aspect, in combination with one or more of the first aspect through the twenty-second aspect, the techniques further include, for a member of the plurality of members, generating and storing a member entry.

In a twenty-fourth aspect, in combination with the twenty-third aspect, the techniques further include, for a member of the plurality of members, receiving operation information associated with the member; and updating the member entry based on the operation information.

In a twenty-fifth aspect, in combination with one or more of the first aspect through the twenty-fourth aspect, the techniques further include receiving a load program associated with a first organization of the plurality of organizations.

In a twenty-sixth aspect, in combination with the twenty-fifth aspect, the techniques further include executing the load program.

In a twenty-seventh aspect, in combination with the twenty-sixth aspect, the techniques for executing the load program further include receiving organization information of the first organization.

In a twenty-eighth aspect, in combination with the twenty-seventh aspect, the techniques for executing the load program further include normalizing the organization information to generate normalized organization information.

In a twenty-ninth aspect, in combination with the twenty-eighth aspect, the techniques for executing the load program further include generating, based on the normalized organization information, a first group model of the plurality of group models, the first group model associated with the first organization.

In a thirtieth aspect, in combination with the twenty-ninth aspect, the techniques for generating the first group model further include generating a first set of group data structures.

In a thirty-first aspect, in combination with the thirtieth aspect, the techniques for generating the first group model further include generating a first set of group member data structures.

In a thirty-second aspect, in combination with the thirty-first aspect, each group member data structure of the first set of group member data structures associated with one or more members of a plurality of members.

In a thirty-third aspect, in combination with the thirty-second aspect, the techniques for generating the first group model further include generating one or more group type data structures.

In a thirty-fourth aspect, in combination with the twenty-ninth aspect, the techniques for executing the load program further include generating hierarchy information associated with a hierarchy of the first organization.

In a thirty-fifth aspect, in combination with one or more of the first aspect through the thirty-fourth aspect, the techniques further include receiving, via an API, a group query request associated with a first group ID of the first group model of the plurality of group models.

In a thirty-sixth aspect, in combination with the thirty-fifth aspect, the techniques further include outputting, based on the first group ID associated with the group query request, output data associated with a hierarchical structure of each group ID subordinate to the first group ID.

In a thirty-seventh aspect, in combination with one or more of the first aspect through the thirty-sixth aspect, the techniques further include receiving, via an application programming interface (API), a member query request associated with a first group ID of the first group model of the plurality of group models.

In a thirty-eighth aspect, in combination with the thirty-seventh aspect, the techniques further include outputting, based on the first group ID associated with the member query request, output data associated with a hierarchical structure of each group ID and each member ID subordinate to the first group ID.

In a thirty-ninth aspect, in combination with the thirty-eighth aspect, the API includes a REST API.

In one or more aspects, techniques for accessing member information from a server storing multiple organization hierarchies may include additional aspects, such as any single aspect or any combination of aspects described below or in connection with one or more other processes or devices described elsewhere herein. In a fortieth aspect, techniques for accessing member information from a server storing multiple organization hierarchies may include transmitting, to a server in which member information and a plurality of group models is stored, an access request to access a first group model of the plurality of group models. The first group model is associated with a first organization of a plurality of organizations. Each group model of the plurality of group models is associated with a different organization of a plurality of organizations and includes multiple group data structures, multiple group type data structures, and multiple group member data structures. Each group model of the plurality of group models is associated with group hierarchy information that indicates a hierarchy associated with the multiple group data structures associated with the group model. The techniques further include receiving, at the user device and based on the access request, first hierarchy information associated with the first group model. In some examples, the techniques in the fortieth aspect may be implemented in a method or process. In some other examples, the techniques of the fortieth aspect may be implemented in an electronic device, such as a device, such as a computer or mobile device, or a component of a device, as illustrative, non-limiting examples. In some examples, the electronic device may include at least one processing unit or system (which may include an application processor, a modem or other components) and at least one memory device coupled to the processing unit. The processing unit may be configured to perform operations described herein with respect to the electronic device. In some examples, the memory device includes a non-transitory computer-readable medium having program code stored thereon that, when executed by the processing unit, is configured to cause the electronic device to perform the operations described herein.

In a forty-first aspect, in combination with the fortieth aspect, the techniques further include storing the first hierarchy information at a memory of the user device.

In a forty-second aspect, in combination with the forty-first aspect, the memory is a cache memory, and the first hierarchy information indicates a hierarchical structure of the multiple group data structures.

In a forty-third aspect, in combination with the forty-first aspect, the first hierarchy information stored at the memory enables generation of one or more reports associated with one or more members of the first organization.

In a forty-fourth aspect, in combination with one or more of the fortieth aspect through the forty-third aspect, the multiple organization hierarchies include multiple OEM hierarchies, and the plurality of organizations include a plurality of OEMs.

In a forty-fifth aspect, in combination with one or more of the fortieth aspect through the forty-fourth aspect, at least one group model of the plurality of group models is associated with OEM information, and the OEM information includes one or more user IDs, user access information, or a combination thereof.

In a forty-sixth aspect, in combination with one or more of the fortieth aspect through the forty-fifth aspect, the techniques further include transmitting, to the server, organization information of the first organization, the first group model generated by the server based on the organization information.

In a forty-seventh aspect, in combination with one or more of the fortieth aspect through the forty-sixth aspect, the techniques further include transmitting, to the server, member information associated with a plurality of members.

In a forty-eighth aspect, in combination with the forty-seventh aspect, the member information includes vehicle information.

In a forty-ninth aspect, in combination with the forty-second aspect, the vehicle information includes a vehicle ID, a VIN, a fleet ID, an active status, created by information, record update information, a state ID, license information, a registration ID, registration expiration information, emission expiration, a toll tag number, an availability date, a location ID, or a combination thereof.

In a fiftieth aspect, in combination with one or more of the fortieth aspect through the forty-ninth aspect, the techniques further include transmitting, via an API, a group query request associated with a first group ID of the first group model of the plurality of group models, and In a fifty-first aspect, in combination with the fiftieth aspect, the techniques further include receiving, based on the group query request, output data associated with a hierarchical structure of each group ID subordinate to the first group ID.

In a fifty-second aspect, in combination with one or more of the fortieth aspect through the forty-ninth aspect, the techniques further include transmitting, via an API, a member query request associated with a first group ID of the first group model of the plurality of group models.

In a fifty-third aspect, in combination with the fifty-second aspect, the techniques further include receiving, based on the member query request, output data associated with a hierarchical structure of each group ID and each member ID subordinate to the first group ID.

In a fifty-fourth aspect, in combination with the fifty-third aspect, the API includes a REST API.

In a fifty-fifth aspect, in combination with one or more of the fortieth aspect through the fifty-fourth aspect, the techniques further include receiving performance metrics of a set of members of multiple members associated with the first group model.

In a fifty-sixth aspect, in combination with the fifty-fifth aspect, the techniques further include initiating output of a display based on the performance metrics and the first hierarchy information.

In a fifty-seventh aspect, in combination with the fifty-fifth aspect, the set of members includes all members of the multiple members.

In a fifty-eighth aspect, in combination with the fifty-seventh aspect, each member of the multiple members includes a vehicle.

In a fifty-ninth aspect, in combination with the fifty-eighth aspect, the performance metrics are associated with vehicle model information, contract information, fleet information, telematics information, payment information, or a combination thereof.

In a sixtieth aspect, in combination with the fifty-fifth aspect, the set of members is a subset of the multiple members that is restricted based on access rights of a user of the user device.

In a sixty-first aspect, in combination with the fifty-fifth aspect, the techniques further include receiving a first selection of a first group type of the multiple group type data structures.

In a sixty-second aspect, in combination with the sixty-first aspect, the techniques further include, in response to the first selection, initiating display of a first aggregation of the performance metrics based on the first hierarchy information.

In a sixty-third aspect, in combination with the sixty-second aspect, the first group type is associated with an OEM, a region group, a region, area, market, a dealer, a dealer group, or a vehicle group.

In a sixty-fourth aspect, in combination with the sixty-second aspect, the techniques further include receiving a second selection of a second group type of the multiple group type data structures.

In a sixty-fifth aspect, in combination with the sixty-fourth aspect, the techniques further include, in response to the second selection, initiating display of a second aggregation of the performance metrics based on the first hierarchy information.

Certain features that are described in this specification in the context of separate implementations also can be implemented in combination in a single implementation. Conversely, various features that are described in the context of a single implementation also can be implemented in multiple implementations separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

Those of skill in the art would understand that information, message, and signals may be represented using any of a variety of different technologies and techniques. For example, data, instructions, commands, information, and signals that may be referenced throughout the above description may be represented by voltages, currents, electromagnetic waves, magnetic fields or particles, optical fields or particles, or any combination thereof.

Components, the functional blocks, and the modules described herein with the figures include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. The various illustrative logics, logical blocks, modules, circuits and algorithm processes described in connection with the implementations disclosed herein may be implemented as electronic hardware, computer software, or combinations of both. In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Additionally, the operations of a method or algorithm may reside as one or any combination or set of codes and instructions on a machine readable medium and computer-readable medium, which may be incorporated into a computer program product.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise.

The term "about" as used herein can allow for a degree of variability in a value or range, for example, within 10%, within 5%, or within 1% of a stated value or of a stated limit of a range, and includes the exact stated value or range. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed implementation, the term "substantially" may be substituted with "within [a percentage] of" what is specified, where the percentage includes 0.1, 1, or 5 percent; and the term "approximately" may be substituted with "within 10 percent of" what is specified. The statement "substantially X to Y" has the same meaning as "substantially X to substantially Y," unless indicated otherwise. Likewise, the statement "substantially X, Y, or substantially Z" has the same meaning as "substantially X, substantially Y, or substantially Z," unless indicated otherwise. Unless stated otherwise, the word or as used herein is an inclusive or and is interchangeable with "and/or," such that when "or" is used in a list of two or more items, means that any one of the listed items can be employed by itself, or any combination of two or more of the listed items can be employed. To illustrate, A, B, or C includes: A alone, B alone, C alone, a combination of A and B, a combination of A and C, a combination of B and C, or a combination of A, B, and C. Similarly, the phrase "A, B, C, or a combination thereof" or "A, B, C, or any combination thereof" includes: A alone, B alone, C alone, a combination of A and B, a combination of A and C, a combination of B and C, or a combination of A, B, and C.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing"). As a result, an apparatus that "comprises," "has," "includes," or "contains" one or more elements possesses those one or more elements, but is not limited to possessing only those one or more elements. Likewise, a method that "comprises," "has," "includes," or "contains" one or more steps possesses those one or more steps, but is not limited to possessing only those one or more steps.

Any implementation of any of the systems, methods, and article of manufacture can consist of or consist essentially of—rather than comprise/have/include—any of the described steps, elements, or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where".

Further, a device or system that is configured in a certain way is configured in at least that way, but it can also be configured in other ways than those specifically described.

The feature or features of one implementation may be applied to other implementations, even though not described or illustrated, unless expressly prohibited by this disclosure or the nature of the implementations.

The claims are not intended to include, and should not be interpreted to include, means-plus- or step-plus-function limitations, unless such a limitation is explicitly recited in a given claim using the phrase(s) "means for" or "step for," respectively.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure and following claims are not intended to be limited to the examples and designs described herein but is to be accorded the widest scope consistent with the principles and novel features disclosed herein.

The invention claimed is:

1. A method, performed by a user device, for accessing member information from a server storing multiple organizational hierarchies, the method comprising:
   sending, to the server, an access request to access a group model of a plurality of group models stored in a memory of the server, the group model associated with an organization of a plurality of organizations;
   receiving hierarchy information indicating an organizational hierarchy that includes multiple group data structures of the group model, the hierarchy information received responsive to the access request; and
   receiving output data associated with a hierarchical structure of each group ID subordinate to a group ID associated with the group model, the output data received responsive to a query request associated with the group ID.

2. The method of claim 1, wherein the hierarchy information indicates the group ID, the method further comprising storing the hierarchy information at a cache memory.

3. The method of claim 1, wherein the multiple group data structures include a group data structure, a group type data structure, a group member data structure, and a member data structure.

4. The method of claim 3, wherein the member data structure is associated with a member, wherein the member includes a vehicle, and wherein the member data structure includes a plurality of data fields configured to store member information associated with the member.

5. The method of claim 4, wherein the plurality of data fields includes a vehicle identification number (VIN) field, wherein the group member data structure includes the VIN field, and wherein including the VIN field in the member data structure and the group member data structure enables VIN information that is stored in the VIN field to be included in the hierarchy information.

6. The method of claim 3, wherein the group data structure includes an ID field, and wherein a value stored in the ID field corresponds to the group ID.

7. The method of claim 1, further comprising:
   initiating display of the output data on an interface element, wherein the output data includes analytics associated with the organization; and
   generating a report based on the output data.

8. The method of claim 1, wherein the hierarchy information includes collection information that includes an aggregation of member information of one or more members associated with the group model.

9. The method of claim 8, further comprising:
sending, to the server, the query request, wherein the query request includes the group ID; and
receiving a portion of the collection information, the portion identified based on the group ID included in the query request.

10. An apparatus for accessing member information from a server storing multiple organizational hierarchies, the apparatus comprising:
at least one processor; and
a memory coupled to the at least one processor and storing processor-readable instructions that, when executed by the at least one processor, are configured to cause the at least one processor to:
initiate transmission, to the server, of an access request to access a group model of a plurality of group models stored in a memory of the server, the group model associated with an organization of a plurality of organizations;
receive hierarchy information indicating an organizational hierarchy that includes multiple group data structures of the group model, the hierarchy information received responsive to the access request; and
receive output data associated with a hierarchical structure of each group ID subordinate to a group ID associated with the group model, the output data received responsive to a query request associated with the group ID.

11. The apparatus of claim 10, wherein the hierarchy information indicates the group ID, the at least one processor further configured to store the hierarchy information at a cache memory.

12. The apparatus of claim 10, wherein the multiple group data structures include a group data structure, a group type data structure, a group member data structure, and a member data structure.

13. The apparatus of claim 12, wherein the member data structure is associated with a member, wherein the member includes a vehicle, and wherein the member data structure includes a plurality of data fields configured to store member information associated with the member.

14. The apparatus of claim 13, wherein the plurality of data fields includes a vehicle identification number (VIN) field, wherein the group member data structure includes the VIN field, and wherein including the VIN field in the member data structure and the group member data structure enables VIN information that is stored in the VIN field to be included in the hierarchy information.

15. A non-transitory computer-readable medium storing instructions that, when executed by a processor, cause the processor to perform operations comprising:
sending, to a server storing multiple organizational hierarchies, an access request to access a group model of a plurality of group models stored in a memory of the server, the group model associated with an organization of a plurality of organizations;
receiving hierarchy information indicating an organizational hierarchy that includes multiple group data structures of the group model, the hierarchy information received responsive to the access request; and
receiving output data associated with a hierarchical structure of each group ID subordinate to a group ID associated with the group model, the output data received responsive to a query request associated with the group ID.

16. The non-transitory computer-readable medium of claim 15, wherein the hierarchy information indicates the group ID, the operations further comprising storing the hierarchy information at a cache memory.

17. The non-transitory computer-readable medium of claim 15, wherein the multiple group data structures include a group data structure, a group type data structure, a group member data structure, and a member data structure.

18. The non-transitory computer-readable medium of claim 17, wherein the group data structure includes an ID field, and wherein a value stored in the ID field corresponds to the group ID.

19. The non-transitory computer-readable medium of claim 17, wherein the member data structure is associated with a member, wherein the member includes a vehicle, and wherein the member data structure includes a plurality of data fields configured to store member information associated with the member.

20. The non-transitory computer-readable medium of claim 19, wherein the plurality of data fields includes a vehicle identification number (VIN) field, wherein the group member data structure includes the VIN field, and wherein including the VIN field in the member data structure and the group member data structure enables VIN information that is stored in the VIN field to be included in the hierarchy information.

* * * * *